United States Patent
Bhardwaj et al.

(10) Patent No.: US 9,793,522 B2
(45) Date of Patent: Oct. 17, 2017

(54) SEALED SOLID STATE BATTERY

(71) Applicant: Verily Life Sciences LLC, Mountain View, CA (US)

(72) Inventors: Ramesh C. Bhardwaj, Fremont, CA (US); James Etzkorn, Mountain View, CA (US); William James Biederman, Fox Island, WA (US); Brian Otis, Saratoga, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 268 days.

(21) Appl. No.: 14/503,634

(22) Filed: Oct. 1, 2014

(65) Prior Publication Data

US 2016/0049624 A1 Feb. 18, 2016

Related U.S. Application Data

(60) Provisional application No. 62/036,715, filed on Aug. 13, 2014.

(51) Int. Cl.
*H01M 2/08* (2006.01)
*H01M 6/40* (2006.01)
(Continued)

(52) U.S. Cl.
CPC ............ *H01M 2/08* (2013.01); *G02C 7/04* (2013.01); *H01M 10/058* (2013.01);
(Continued)

(58) Field of Classification Search
CPC ...... H01M 6/40; H01M 2/08; H01M 10/0562; H01M 10/0525; H01M 10/058; G02C 7/04
(Continued)

(56) References Cited

U.S. PATENT DOCUMENTS

2004/0018424 A1* 1/2004 Zhang ............... H01M 10/0585
429/162
2004/0029311 A1 2/2004 Snyder et al.
(Continued)

FOREIGN PATENT DOCUMENTS

FR 2977729 A1 * 1/2013 .......... H01M 2/0207

OTHER PUBLICATIONS

International Searching Authority, Written Opinion mailed on Jul. 24, 2015, issued in connection with PCT/US2015/035482, filed on Jun. 12, 2015, 7 pages.

*Primary Examiner* — Sean P Cullen
(74) *Attorney, Agent, or Firm* — McDonnell Boehnen Hulbert & Berghoff LLP

(57) ABSTRACT

An electrochemical battery can include electrodes (a cathode and an electrode) arranged on respective surfaces of an electrolyte. The electrodes and electrolyte can each be solid state films that can be layered on top of one another to create a stacked structure disposed on a substrate. A polymeric sealant material can be applied over and around the battery stack and a moisture barrier can be formed over the sealant material to thereby prevent moisture from reaching the battery. Conductive terminals electrically coupled to the cathode and anode, respectively, can be formed on a second side of the substrate. As such, the battery can be flip-chip mounted to corresponding mounting pads and thereby connected to other electronics that can receive power from the battery.

20 Claims, 13 Drawing Sheets

(51) Int. Cl.
*H01M 10/02* (2006.01)
*H01M 10/0525* (2010.01)
*H01M 10/0562* (2010.01)
*H01M 10/058* (2010.01)
*G02C 7/04* (2006.01)
*G02C 11/00* (2006.01)
*G02B 1/04* (2006.01)

(52) U.S. Cl.
CPC ... *H01M 10/0525* (2013.01); *H01M 10/0562* (2013.01); *G02B 1/043* (2013.01); *G02C 11/10* (2013.01); *H01M 2300/002* (2013.01)

(58) Field of Classification Search
USPC .................. 429/124, 162, 163, 178; 29/623.2
See application file for complete search history.

(56) References Cited

U.S. PATENT DOCUMENTS

| | | | |
|---|---|---|---|
| 2007/0156184 A1 | 7/2007 | Root et al. | |
| 2007/0184345 A1* | 8/2007 | Neudecker | H01M 4/0404 429/209 |
| 2007/0238019 A1* | 10/2007 | Laurent | H01M 2/0257 429/163 |
| 2008/0003492 A1 | 1/2008 | Bates | |
| 2009/0202899 A1* | 8/2009 | Pyszczek | H01M 6/06 429/152 |
| 2011/0076550 A1* | 3/2011 | Liang | H01M 2/0202 429/175 |
| 2012/0218508 A1* | 8/2012 | Pugh | B29D 11/00028 351/159.01 |
| 2012/0245444 A1 | 9/2012 | Otis et al. | |
| 2014/0178743 A1* | 6/2014 | Delepierre | H01M 2/0207 429/156 |

\* cited by examiner

SEALED SOLID STATE BATTERY

CROSS-REFERENCE TO RELATED APPLICATIONS

This application claims priority to U.S. Provisional Patent Application No. 62/036,715, filed Aug. 13, 2014, which is incorporated herein by reference in its entirety and for all purposes.

BACKGROUND

Unless otherwise indicated herein, the materials described in this section are not prior art to the claims in this application and are not admitted to be prior art by inclusion in this section.

Advances in battery technology have enabled the fabrication of tiny, high-energy-density electrochemical batteries capable of powering advanced devices for extended periods of time while occupying small volumes. An electrochemical battery comprises an electrolyte interposed between two electrodes (an anode and a cathode). Electrochemical reactions between the anode and the electrolyte and between the electrolyte and the cathode can cause the development of an electrical potential between the electrodes. Continued electrochemical reactions could drive an electrical current from one electrode, through a device connected to the electrodes, to the opposite electrodes, allowing the device to be powered by the electrical current.

Lithium ion batteries include a cathode and an anode separated from one another by an electrolyte that transfers lithium ions. During discharge, when the battery is providing current to a circuit connected across the electrodes, redox reactions occur at the two electrodes. Oxidation reactions at the anode ionize lithium, which releases electrons to the connected circuit from the anode, which causes a current to flow through the connected circuit from cathode to anode (i.e., reverse the direction of electron travel). Lithium ions are transferred through the electrolyte from the anode to the cathode to balance the flow of electrons in the circuit. At the cathode, the lithium ions and electrons are reduced. The difference in energy potential between the lithium when at the anode and at the cathode corresponds to the chemically stored energy in the battery. In some cases, lithium batteries may be re-charged by applying a reverse current to the electrodes, which causes lithium ions to traverse the electrolyte in the opposite direction, and to re-supply the anode with lithium.

SUMMARY

An electrochemical battery can include electrodes (a cathode and an electrode) arranged on opposite surfaces of an electrolyte. The electrodes and electrolyte can each be solid state films that can be layered on top of one another to create a stacked structure disposed on a substrate. A polymeric sealant material can be applied over and around the battery stack and a moisture barrier can be formed over the sealant material to thereby prevent moisture from reaching the battery. Conductive terminals electrically connected to the cathode and anode, respectively, can then be formed on a second side of the substrate opposite the first side. As such, the battery can be flip-chip mounted to corresponding mounting pads and thereby connected to other electronics that can receive power from the battery.

Some embodiments of the present disclosure can include a sealed battery. The sealed battery can include a substrate, a battery stack, a polymeric sealant layer, a first conductive pad, and a second conductive pad. The substrate can have a first side and a second side. The battery stack can be disposed on the first side of the substrate. The battery stack can include a cathode layer, an anode layer, and an electrolyte layer. A first one of the cathode layer and the anode layer can be disposed on the first side of the substrate. The electrolyte layer can be disposed between the cathode layer and the anode layer. The polymeric sealant layer can be formed over and around the battery stack. The first conductive pad can be situated on the second side of the substrate, and can be electrically coupled to the cathode layer. The second conductive pad can be situated on the second side of the substrate, and can be electrically coupled to the anode layer.

Some embodiments of the present disclosure can include a body-mountable device. The body-mountable device can include a polymeric material formed to have a body-mountable surface, and a sealed battery embedded within the polymeric material. The sealed battery can include a substrate, a battery stack, a polymeric sealant layer, a first conductive pad, and a second conductive pad. The substrate can have a first side and a second side. The battery stack can be disposed on the first side of the substrate. The battery stack can include a cathode layer, an anode layer, and an electrolyte layer. A first one of the cathode layer and the anode layer can be disposed on the first side of the substrate. The electrolyte layer can be situated between the cathode layer and the anode layer. The polymeric sealant layer can be formed over and around the battery stack. The first conductive pad can be situated on the second side of the substrate, and can be electrically coupled to the cathode layer. The second conductive pad can be situated on the second side of the substrate, and can be electrically coupled to the anode layer.

Some embodiments of the present disclosure can include a method. The method can include forming a battery stack on a first side of a substrate. Forming the battery stack can include: (i) forming a cathode current collector layer on the first side of the substrate such that the cathode current collector layer occupies at least a first region of the first side of the substrate; (ii) forming a cathode active layer on the cathode current collector layer; (iii) forming an electrolyte layer on the cathode active layer; (iv) forming an anode active layer on the electrolyte layer; and (v) forming an anode current collector layer on the anode active layer. A portion of the anode current collector layer can extend beyond the anode active layer and be disposed on the first side of the substrate such that the anode current collector layer occupies at least a second region of the first side of the substrate. The method can also include applying a polymeric sealant layer over and around battery stack to thereby encapsulate the battery stack between the polymeric sealant layer and the substrate. The method can also include applying a moisture barrier over the polymeric sealant layer to thereby inhibit moisture from reaching the polymeric sealant layer and the battery stack. The method can also include forming a first aperture and a second aperture in the substrate. The first aperture can expose, from the second side of the substrate, at least a portion of the cathode current collector. The second aperture can expose, from the second side of the substrate, at least a portion of the anode current collector. The method can also include filling at least a portion of each of the first and second apertures with conductive material to thereby create respective electrical pathways through the substrate. The method can also include forming, on the second side of the substrate, a first conductive pad that is electrically coupled to the conductive material within the first aperture, such that the first conductive pad is electrically coupled to the cathode current collector layer. The method can also include forming, on the second side of the substrate, a second conductive pad that is electrically coupled to the conductive material within the second aperture, such that the second conductive pad is electrically coupled to the anode current collector layer.

Some embodiments of the present disclosure include means for forming a battery stack on a first side of a substrate. Some embodiments of the present disclosure include means for applying a polymeric sealant layer over and around battery stack to thereby encapsulate the battery stack between the polymeric sealant layer and the substrate. Some embodiments of the present disclosure include means for applying a moisture barrier over the polymeric sealant layer to thereby inhibit moisture from reaching the polymeric sealant layer and the battery stack. Some embodiments of the present disclosure include means for forming a first aperture and a second aperture in the substrate. Some embodiments of the present disclosure include means for filling at least a portion of each of the first and second apertures with conductive material to thereby create respective electrical pathways through the substrate. Some embodiments of the present disclosure include means for forming, on the second side of the substrate, a first conductive pad that is electrically coupled to the conductive material within the first aperture, such that the first conductive pad is electrically coupled to the cathode current collector layer. Some embodiments of the present disclosure include means for forming, on the second side of the substrate, a second conductive pad that is electrically coupled to the conductive material within the second aperture, such that the second conductive pad is electrically coupled to the anode current collector layer.

These as well as other aspects, advantages, and alternatives, will become apparent to those of ordinary skill in the art by reading the following detailed description, with reference where appropriate to the accompanying drawings.

DETAILED DESCRIPTION

Figure 1:
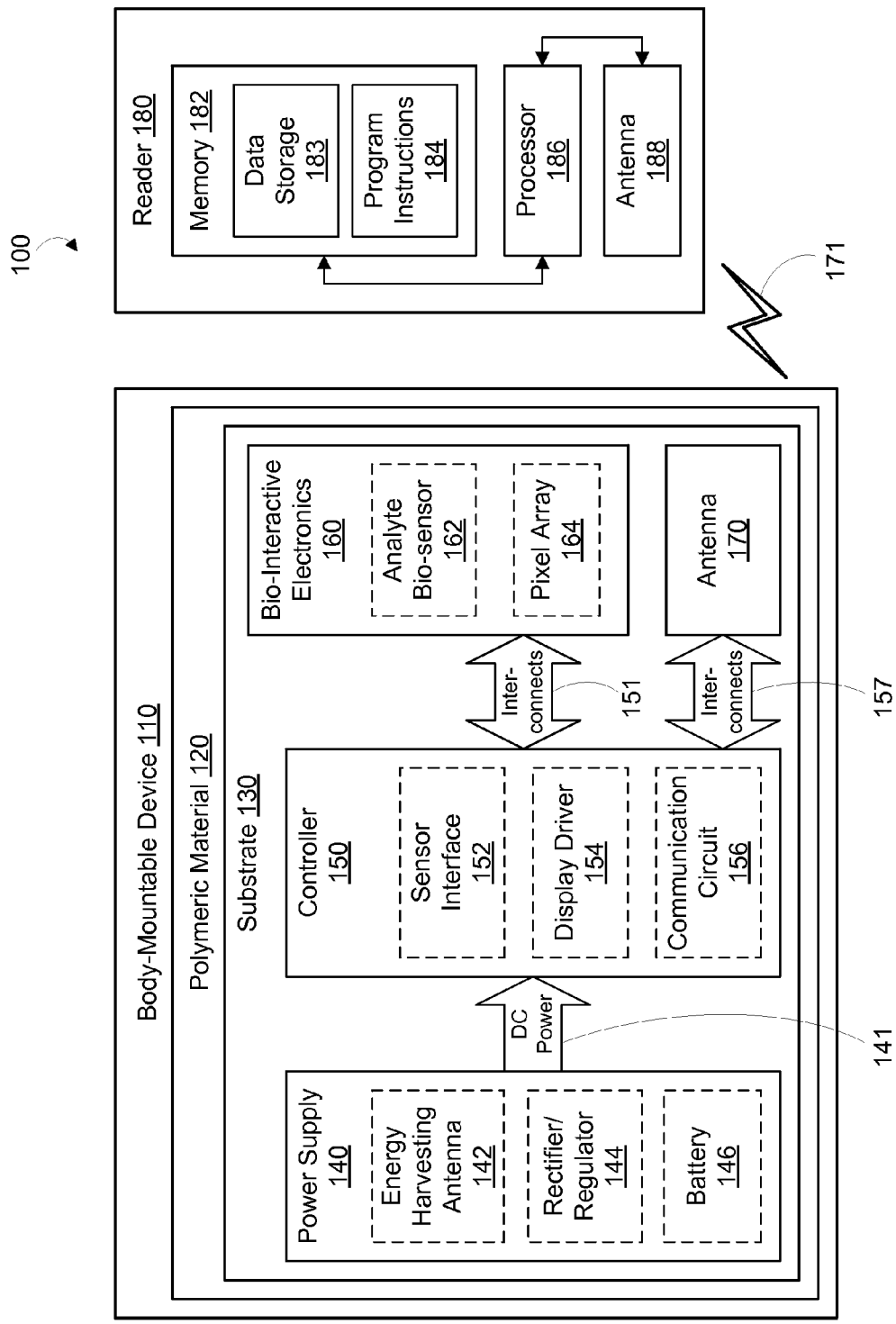
FIG. 1 is a block diagram of an example system that includes a body-mountable device in wireless communication with an external reader.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An electrochemical battery can include electrodes (a cathode and an electrode) arranged on respective surfaces of an electrolyte. The electrodes and electrolyte can each be solid state films that can be layered on top of one another to create a stacked structure disposed on a substrate. A polymeric sealant material can be applied over and around the battery stack and a moisture barrier can be formed over the sealant material to thereby prevent moisture from reaching the battery. Conductive terminals electrically coupled to the cathode and anode, respectively, can be formed on a second side of the substrate. As such, the battery can be flip-chip mounted to corresponding mounting pads and thereby connected to other electronics that can receive power from the battery.

The stacked cathode, electrolyte, and anode can be surrounded by a polymeric sealant material that conforms on and around the battery layers to encapsulate the battery between the sealant material and the substrate. A moisture barrier can then be applied over the polymeric sealant material to inhibit moisture from reaching the stacked battery layers and the sealant material. Thus formed, the sealed battery is substantially resistant to deleterious effects of moisture and/or contaminants. The sealed battery may also be integrated into a device that is coated with a biocompatible material, such as a conformal layer of parylene or another material, and used in a biological environment. For instance, the sealed battery may be used in a body-mountable device or implantable device. In some cases, the disclosed battery may be fabricated in bulk by patterning electrode and electrolyte films on a common substrate. The substrate can include conductive vias that electrically couple each electrode to a respective conductive terminal on the opposite side of the substrate.

The substrate with battery cells thereon can then be diced to separate the individual battery cells, and the individual batteries can be sealed by applying sealant material over and around the stacked battery layers. The sealed battery can then be flip-chip mounted to connect to other electronics by bonding the mounting pads to corresponding conductive terminals or traces that provide an electrical connection to the electronics. The mounted battery can then provide power to the connected electronics. In some cases, the sealed battery may be incorporated in a body-mountable device or an implantable device, and used to power electronics in such devices. In such applications, fabrication of the solid state battery can be isolated from fabrication of the other electronics in the device, which allows for such other electronics to be fabricated without restrictions associated with thin film battery fabrication.

For instance, fabricating the battery may involve annealing at relatively high temperatures, such as about 800° C. to crystallize the cathode material, or the battery substrate may be rinsed with harsh solvents at various stages. Therefore, if the battery were assembled directly on the same substrate as other electronics (e.g., chips, sensors, antennas, etc.), the selection of materials and/or processing order would be constrained by the need for compliance with the battery fabrication (e.g., high temperatures, harsh solvents, etc.). Among other factors, such limitations may lead to selecting substrate materials that can withstand 800° C., for example. However, because the battery described herein can be integrated into a device by flip-chip bonding onto corresponding mounting pads, all electronics in the device other than the battery can be fabricated without such limitations. Thus, the substrate on which such other electronics are disposed need not be compliant with temperatures and/or solvents used in the microfabrication of the battery itself. For instance, substrates for supporting the remaining electronics may be substrates that are not typically used for battery fabrication, such as polymeric materials (e.g., parylene or polyamide substrates). In addition, the fabrication of the battery can be performed in bulk by simultaneously fabricating a large number of batteries on a common substrate in a single sequence of deposition operations. The common substrate with batteries formed thereon can then be diced to separate the individual batteries. As a result, in addition to providing enhanced design flexibility, the disclosed battery also offers increased efficiency and reduced costs of fabrication.

The fully assembled battery may have a thickness less than 100 micrometers. For example, each of the cathode, electrolyte, and anode layers can have thicknesses of about 2-3 micrometers, so the battery stack can have a total thickness of about 6-10 micrometers. For instance, the cathode may include a deposited layer of lithium cobalt oxide or a similar material; the electrolyte may include a deposited layer of lithium phosphorus oxynitride; and the anode may include a layer of evaporated lithium metal. The substrate with the battery stack disposed on one side and the conductive mounting pads on the other side can have a thickness of about 20-40 micrometers. Such a substrate may be, for example, a silicon chip polished to desired thickness. Finally, the sealant layer and/or moisture barrier can have a thickness of about 10-30 micrometers. The assembled batter can therefore be well suited to use in environments exposed to moisture, such as mounted to a body of a biological host or implanted within a biological host. In some applications, the total thickness of various layers (and other dimension variables) may be selected in part to provide a target energy storage capacity and/or power delivery, in addition to factors related to size/weight constraints.

In some examples, the disclosed battery may be included in an eye-mountable device similar to a contact lens. The battery can be used to power various bio-interactive electronics in the eye-mountable device. For example, the eye-mountable device may include a sensor for measuring properties of tear fluid. The sealed battery can be flip-chip mounted to conductive pads that connect to additional electronics on a substrate material. That substrate can be embedded within a polymeric material formed to be mounted to an eye surface. The contact lens device can be configured to operate a sensor to obtain a measurement of tear fluid analyte concentration and then use an antenna to communicate the results to an external reader. For instance, a control chip may be connected to the battery, an antenna, and a sensor, all of which may be disposed on a substrate embedded in the polymeric material of the contact lens. The chip can be configured to: (i) receive power from the battery; (ii) operate the sensor to obtain a measurement, and (iii) communicate the measurement using the antenna.

The sensor in such an eye-mountable device (or other body-mountable device) may be an electrochemical sensor for obtaining measurements of an analyte concentration of the tear fluid. The electrochemical sensor can include a working electrode and a reference electrode (or counter electrode) that are exposed to the tear fluid. During measurement, the working electrode can be charged relative to the reference electrode to cause an analyte in the tear fluid to undergo electrochemical reactions at the working electrode. Those reactions result in an amperometric current between the electrodes due to the analyte being electrochemically consumed at the working electrode. The current thus provides an indication of analyte concentration in the tear fluid. The control chip may also operate the antenna to wirelessly communicate sensor measurements, such as an indication of the amperometric current.

In another example, the battery may be used to power electronics in other devices and/or applications. The disclosed sealed solid state battery may be used, for example, in applications with size and/or weight constraints (e.g., devices with thickness less than one millimeter). Examples may include environmental sensors, implantable devices, or other electronics. Small sensors may be coupled to airfoils and dispersed to obtain measurements from different locations of particulate concentration, temperature, or other measurements related to air quality. In some instances, sensors or other devices may be integrated into an adhesive substrate, similar to a sticker, which can be affixed to various surfaces. Such adhesive electronic devices may be used, for example, to facilitate air quality measurements or other safety-related measurements experienced by a person wearing the adhesive device on their garments and/or bodies. Adhesive devices may also be affixed to items and used to facilitate identification of parcels, vehicles, or the like by providing active RFID chips powered by the battery integrated in the adhesive device. Many other example applications are possible for sealed solid state batteries.

II. Example Body-mountable Electronics Platform

FIG. 1 is a block diagram of a system 100 that includes a body-mountable device 110 in wireless communication with an external reader 180. The body-mountable device 110 is made of a polymeric material 120 formed to be mounted to a body surface. For instance, the polymeric material 120 may be formed to be contact-mounted to a corneal surface of an eye. A substrate 130 is embedded in the polymeric material 120 to provide a mounting location for electronic components such as a power supply 140, a controller 150, bio-interactive electronics 160, and a communication antenna 170. The bio-interactive electronics 160 are operated by the controller 150. The power supply 140 supplies operating voltages to the controller 150 and/or the bio-interactive electronics 160. The communication antenna 170 is operated by the controller 150 to communicate information to and/or from the body-mountable device 110. The communication antenna 170, the controller 150, the power supply 140, and the bio-interactive electronics 160 can all be situated on the embedded substrate 130. In applications in which the body-mountable device is arranged to be contact-mounted to an eye, similar to a contact lens, it may also be referred to herein as an ophthalmic electronics platform.

A. Polymeric Material

The polymeric material 120 can be shaped to include an external surface that is configured to interface with a desired body-mounting location. For example, the polymeric material 120 may include a tooth-mountable surface, a head-mountable surface, an ear-mountable surface, a skin-mountable surface, an eye-mountable surface, and so on. The body-mountable device 110 may also be implemented in a form factor configured to be mounted to other body locations so as to access sample fluids in-vivo, including implantable configurations. For example, the polymeric material 120 may be smooth and include a bio-compatible coating suitable for applications in which the body-mountable device 110 is implanted under and/or within the skin. The polymeric material 120 may partially or entirely encapsulate electronics within the body-mountable device 110. In some examples, the body-mountable device 110 may include a mounting surface configured to be mounted to a tooth, a skin surface, a mucous membrane, upon a subcutaneous region, within an interstitial region, or in another region in which in-vivo fluid analyte concentrations may be measured.

To facilitate contact-mounting to an eye, the polymeric material 120 can have a concave surface configured to adhere ("mount") to a moistened corneal surface (e.g., by capillary forces with tear film coating the corneal surface). Additionally or alternatively, the body-mountable device 110 can be adhered by a vacuum force between the corneal surface and the polymeric material due to the concave curvature. While mounted with the concave surface against the eye, the outward-facing surface of the polymeric material 120 can have a convex curvature that is formed to not interfere with eye-lid motion while the body-mountable device 110 is mounted to the eye. For example, the polymeric material 120 can be a substantially transparent curved polymeric disk shaped similarly to a contact lens.

The polymeric material 120 can include one or more biocompatible materials, such as those employed for use in contact lenses or other ophthalmic applications involving direct contact with the corneal surface. The polymeric material 120 can optionally be formed in part from such biocompatible materials or can include an outer coating with such biocompatible materials. The polymeric material 120 can include materials configured to moisturize the corneal surface, such as hydrogels and the like. In some embodiments, the polymeric material 120 can be a deformable ("non-rigid") material to enhance wearer comfort. In some embodiments, the polymeric material 120 can be shaped to provide a predetermined, vision-correcting optical power (e.g., for vision correction applications).

B. Substrate

The substrate 130 includes one or more surfaces suitable for mounting the bio-interactive electronics 160, the controller 150, the power supply 140, and the communication antenna 170. The substrate 130 can be used both as a mounting platform for chip-based circuitry (e.g., by flip-chip mounting to conductive terminals patterned on the substrate 130) and/or as a platform for patterning conductive materials (e.g., gold, platinum, palladium, titanium, copper, aluminum, silver, metals, other conductive materials, combinations of these, etc.) to create electrodes, interconnects, connection pads, antenna, etc. In some examples, substantially transparent conductive materials (e.g., indium tin oxide) can be patterned on the substrate 130 to form circuitry, electrodes, etc. For example, the communication antenna 170 can be fabricated by forming a pattern of gold or another conductive material on the substrate 130 by deposition, photolithography, electroplating, etc. Similarly, interconnects 151, 157 between the controller 150 and the bio-interactive electronics 160, and between the controller 150 and the communication antenna 170, respectively, can be formed by depositing suitable patterns of conductive materials on the substrate 130. A combination of microfabrication techniques including, without limitation, the use of photoresists, masks, deposition techniques, and/or electroplating techniques can be employed to pattern such materials on the substrate 130.

The substrate 130 can be a relatively rigid material, such as polyethylene terephthalate ("PET"), parylene, and/or another material configured to structurally support the circuitry and/or chip-based electronics within the polymeric material 120. The body-mountable device 110 can alternatively be arranged with a group of unconnected substrates rather than a single substrate. For example, the controller 150 and a sensor included in the bio-interactive electronics 160 can be mounted to one substrate, while the communication antenna 170 is mounted to another substrate and the two can be electrically connected via the interconnects 157. In another example, the substrate 130 can include separate partitions that each support separated, overlapped coiled portions of the communication antenna 170. Such as, for instance, an embodiment in which the communication antenna 170 is divided into multiple windings that wrap around the body-mountable device 110 circumferentially at respective radii, and are connected in parallel and/or in series. To facilitate movement of the individual windings with respect to one another, and thereby enhance flexibility of the body-mountable device 110, and help prevent binding or other deformation of the antenna, the individual windings may each be mounted on separated portions of the substrate 130.

In an eye-mountable application, the substrate 130 (and the bio-interactive electronics 160 thereon) can be positioned away from the area of the body-mountable device 110 through which light is transmitted to the pupil (e.g., the center of the device). As such, the substrate 130 can avoid interference with light transmission to the central, light-sensitive region of the eye. For example, where the body-mountable device 110 is shaped as a concave-curved disk, the substrate 130 can be embedded around the periphery (e.g., near the outer circumference) of the disk. In some examples, however, the bio-interactive electronics 160 (and the substrate 130) can be positioned in or near the central region of the body-mountable device 110. Additionally or alternatively, the bio-interactive electronics 160 and/or the substrate 130 can be substantially transparent to incoming visible light to mitigate interference with light transmission to the eye. Moreover, in some embodiments, the bio-interactive electronics 160 can include a pixel array 164 that emits and/or transmits light to be received by the eye according to display instructions. Thus, the bio-interactive electronics 160 can optionally be positioned so as to generate perceivable visual cues to a wearer of an eye-mountable device, such as by displaying information (e.g., characters, symbols, flashing patterns, etc.) on the pixel array 164.

The dimensions of the substrate 130 can depend on a variety of factors. For instance, in an eye-mountable application, the substrate 130 can be shaped as a flattened ring with a radial width dimension sufficient to provide a mounting platform for the embedded electronics components. The substrate 130 can have a thickness sufficiently small to allow the substrate 130 to be embedded in the polymeric material 120 without influencing the profile of the eye-mountable device. The substrate 130 can have a thickness sufficiently large to provide structural stability suitable for supporting the electronics mounted thereon. For example, the substrate 130 may be shaped as a ring with a diameter of about 10 millimeters, a radial width of about 1 millimeter (e.g., an outer radius 1 millimeter larger than an inner radius), and a thickness of about 50 micrometers. The substrate 130 may be shaped along the surface of an imaginary cone between two circular rings that define an inner radius and an outer radius. In such an example, the surface of the substrate 130 along the surface of the imaginary cone defines an inclined surface that is approximately aligned with the curvature of the eye mounting surface at that radius.

C. Power Supply

The power supply 140 is configured to harvest ambient energy to charge a battery 146, which then supplies a DC supply voltage 141 to power the controller 150 and bio-interactive electronics 160. For example, a radio-frequency energy-harvesting antenna 142 can capture energy from incident radio radiation. Additionally or alternatively, solar cell(s) ("photovoltaic cells") can capture energy from incoming ultraviolet, visible, and/or infrared radiation. Furthermore, an inertial power scavenging system can be included to capture energy from motion of the body-mountable device 110. The radio-frequency energy-harvesting antenna 142 can optionally be a dual-purpose antenna that is also used to communicate information to the external reader 180. That is, the functions of the communication antenna 170 and the radio-frequency energy-harvesting antenna 142 can be accomplished with the same physical component(s).

A rectifier/regulator 144 can be used to condition the captured energy to a stable DC supply voltage 141 that is supplied to the controller 150. For example, the radio-frequency energy-harvesting antenna 142 can receive incident radio frequency radiation. Varying electrical signals on the leads of the radio-frequency energy-harvesting antenna 142 are output to the rectifier/regulator 144. The rectifier/regulator 144 rectifies the varying electrical signals to a DC voltage and regulates the rectified DC voltage to a level suitable for charging the battery 146. During operation of the body-mountable device 110, the battery 146 can supply the DC supply voltage 141 to the controller 150 and the bio-interactive electronics 160, which discharges the battery 146. Thus, the battery 146 can be a rechargeable electrochemical cell that stores energy in accordance with respective chemical energy states of a cathode and an anode. The battery can include a solid state electrolyte, such as lithium phosphorus oxynitride (LIPON). In such examples, the battery may be formed by layering films of cathode material, electrolyte material, and anode material over one another. Additional examples of solid state batteries that may be integrated into the body-mountable device 110 are described below.

D. Controller and Bio-interactive Electronics

The controller 150 can be turned on when the DC supply voltage 141 is provided to the controller 150, and the logic in the controller 150 operates the bio-interactive electronics 160 and the communication antenna 170. The controller 150 can include logic circuitry configured to operate the bio-interactive electronics 160 so as to interact with a biological environment of the body-mountable device 110. For instance, one or more components, such as an analyte bio-sensor 162, can be used to obtain input from the biological environment. Additionally or alternatively, one or more components, such as the pixel array 164, can be used to provide an output to the biological environment.

In one example, the controller 150 includes a sensor interface module 152 that is configured to operate analyte bio-sensor 162. The analyte bio-sensor 162 can be, for example, an amperometric electrochemical sensor that includes a working electrode and a reference electrode. A voltage can be applied between the working and reference electrodes to cause an analyte to undergo an electrochemical reaction (e.g., a reduction and/or oxidation reaction) at the working electrode. The electrochemical reaction generates an amperometric current that can be measured through the working electrode. The amperometric current is related to the electrochemical reaction rate, which is related to the analyte concentration. Thus, the amperometric current that is measured through the working electrode can provide an indication of analyte concentration. In some embodiments, the sensor interface module 152 can be a potentiostat configured to apply a voltage between working and reference electrodes while measuring a current through the working electrode.

In some instances, a reagent can also be included to sensitize the electrochemical sensor to one or more particular analytes. For example, a layer of glucose oxidase ("GOx") proximal to the working electrode can catalyze glucose oxidation to generate hydrogen peroxide ($H_2O_2$). The hydrogen peroxide can then be electrooxidized at the working electrode, which releases electrons to the working electrode, resulting in an amperometric current that can be measured through the working electrode. These reactions are shown below.

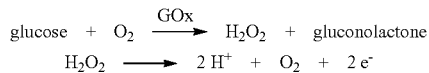

The current generated by either reduction or oxidation reactions is approximately proportionate to the electrochemical reaction rate. Further, the reaction rate is dependent on the rate of analyte molecules reaching the electrochemical sensor electrodes to fuel the reactions, either directly or catalytically through a reagent. In a steady state, analyte molecules diffuse to the electrochemical sensor electrodes at approximately the same rate that additional analyte molecules diffuse to the sampled region, and the reaction rate is approximately proportionate to the concentration of the analyte molecules. The current measured through the working electrode thus provides an indication of the analyte concentration.

The controller 150 can optionally include a display driver module 154 for operating a pixel array 164. The pixel array 164 can be an array of separately programmable light transmitting, light reflecting, and/or light emitting pixels arranged in rows and columns. The individual pixel circuits can optionally include liquid crystal technologies, micro-electromechanical technologies, emissive diode technologies, etc. to selectively transmit, reflect, and/or emit light according to information from the display driver module 154. Such a pixel array 164 can also optionally include more than one color of pixels (e.g., red, green, and blue pixels) to render visual content in color. The display driver module 154 can include, for example, one or more data lines providing programming information to the separately programmed pixels in the pixel array 164 and one or more addressing lines for setting groups of pixels to receive such programming information. Such a pixel array 164 situated on the eye can also be associated with one or more lenses to direct light to a focal plane perceivable by the eye.

The controller 150 can also include a communication circuit 156 for sending and/or receiving information via the communication antenna 170. The communication circuit 156 can optionally include one or more oscillators, mixers, frequency injectors, etc. to modulate and/or demodulate information on a carrier frequency to be transmitted and/or received by the communication antenna 170. In some examples, the body-mountable device 110 is configured to indicate an output from a bio-sensor by modulating an impedance of the communication antenna 170 in a manner that is perceivable by the external reader 180. For example, the communication circuit 156 can cause variations in the amplitude, phase, and/or frequency of backscatter radiation from the communication antenna 170, and such variations can be detected by the external reader 180.

The controller 150 is connected to the bio-interactive electronics 160 via interconnects 151. For example, where the controller 150 includes logic elements implemented in an integrated circuit to form the sensor interface module 152 and/or display driver module 154, a patterned conductive material (e.g., gold, platinum, palladium, titanium, copper, aluminum, silver, metals, combinations of these, etc.) can connect a terminal on the chip to the bio-interactive electronics 160. Similarly, the controller 150 is connected to the communication antenna 170 via interconnects 157.

It is noted that the block diagram shown in FIG. 1 is described in connection with functional modules for convenience in description. However, embodiments of the body-mountable device 110 can be arranged with one or more of the functional modules ("sub-systems") implemented in a single chip, integrated circuit, and/or physical component. For example, while the rectifier/regulator 144 is illustrated in the power supply 140, the rectifier/regulator 144 can be implemented in a chip that also includes the logic elements of the controller 150 and/or other features of the embedded electronics in the body-mountable device 110. Thus, the DC supply voltage 141 that is provided to the controller 150 from the power supply 140 can be a supply voltage that is provided to components on a chip by rectifier and/or regulator components located on the same chip. That is, the functional blocks in FIG. 1 shown as the power supply 140 and controller 150 need not be implemented as physically separated modules. Moreover, one or more of the functional modules described in FIG. 1 can be implemented by separately packaged chips electrically connected to one another.

Additionally or alternatively, the radio-frequency energy-harvesting antenna 142 and the communication antenna 170 can be implemented with the same physical antenna. For example, a loop antenna can both harvest incident radiation for power generation and communicate information via backscatter radiation.

E. Reader

The external reader 180 includes an antenna 188 (or a group of multiple antennas) to send and receive backscatter signals 171 to and from the body-mountable device 110. The external reader 180 also includes a computing system with a processor 186 in communication with a memory 182. The memory 182 can be a non-transitory computer-readable medium that can include, without limitation, magnetic disks, optical disks, organic memory, and/or any other volatile (e.g. RAM) or non-volatile (e.g. ROM) storage system readable by the processor 186. The memory 182 can include a data storage 183 to store indications of data, such as sensor readings (e.g., from the analyte bio-sensor 162), program settings (e.g., to adjust behavior of the body-mountable device 110 and/or external reader 180), etc. The memory 182 can also include program instructions 184 for execution by the processor 186 to cause the external reader 180 to perform processes specified by the instructions 184. For example, the program instructions 184 can cause external reader 180 to provide a user interface that allows for retrieving information communicated from the body-mountable device 110 (e.g., sensor outputs from the analyte bio-sensor 162). The external reader 180 can also include one or more hardware components for operating the antenna 188 to send and receive the backscatter signals 171 to and from the body-mountable device 110. For example, oscillators, frequency injectors, encoders, decoders, amplifiers, filters, etc. can drive the antenna 188 according to instructions from the processor 186.

The external reader 180 can be a smartphone, digital assistant, or other portable computing device with wireless connectivity sufficient to provide the backscatter signals 171. The external reader 180 can also be implemented as an antenna module that can be plugged in to a portable computing device, such as in an example where the backscatter signals 171 operate at carrier frequencies not commonly employed in portable computing devices. In some instances, the external reader 180 is a special-purpose device configured to be worn relatively near a wearer's eye to allow the backscatter signals 171 to operate with a low power budget. For example, the external reader 180 can be integrated in a piece of jewelry such as a necklace, earring, etc. or integrated in an article of clothing or an accessory worn near the head, such as a hat, headband, a scarf, a pair of eyeglasses, etc.

In some embodiments, the system 100 can operate to non-continuously ("intermittently") supply energy to the body-mountable device 110 to power the controller 150 and bio-interactive electronics 160. For example, backscatter signals 171 can be supplied to power the body-mountable device 110 long enough to operate the bio-interactive electronics 160 and communicate an outcome of such operation. In such an example, the supplied backscatter signals 171 can be considered an interrogation signal from the external reader 180 to the body-mountable device 110 to request feedback (e.g., a sensor measurement). By periodically interrogating the body-mountable device 110 (e.g., by supplying backscatter signals 171 to temporarily turn the device on), the external reader 180 can accumulate a set of measurements (or other feedback) over time from the bio-interactive electronics 160 without continuously powering the body-mountable device 110.

F. Example Operation

In practice, the power supply 140 can function to harvest energy from received radio frequency radiation using the radio-frequency energy-harvesting antenna 142 and the rectifier/regulator 144, and the harvested energy can be used to charge the battery 146. For example, radio frequency radiation can cause radio frequency electrical signals on leads of the radio-frequency energy-harvesting antenna 142. The rectifier/regulator 144 can be connected to the antenna leads and convert the radio frequency electrical signals to a DC voltage, which can be applied to the battery 146 to create a charging current. The battery 146 can then output supply voltages (i.e., the DC power 141) to operate the hardware logic of the controller 150 and also to power the analyte bio-sensor 162. The DC supply voltage(s) 141 may be voltages suitable for driving digital logic circuitry, such as approximately 1.2 volts, approximately 3 volts, etc. In some examples, reception of the radio frequency radiation from the external reader 180 (or another source, such as ambient radiation, etc.) causes the DC supply voltages 141 to be supplied to the anlyte bio-sensor 162 and hardware logic of the controller 150, thereby activating the body-mountable device 110. While powered, the analyte bio-sensor 162 and sensor interface module 152 of the controller 150 are configured to generate and measure a current indicative of analyte concentration and communicate the results.

The external reader 180 associates the backscatter signal 171 with the sensor result (e.g., according to a pre-programmed relationship associating impedance of the communication antenna 170 with output from the analyte bio-sensor 162 using look-up tables, calibration information, etc.). The external reader 180 can then store the indicated sensor results (e.g., analyte concentration values) in a local memory and/or an external data storage (e.g., by communicating through a network).

In some embodiments, one or more of the features shown as separate functional blocks can be implemented ("packaged") on a single chip. For example, the body-mountable device 110 can be implemented with a rectifier/regulator 144, voltage regulator, sensor interface module 152, and other hardware logic packaged together in a single chip or controller module. In some cases, the battery 146 may be electrically coupled to such a chip via conductive traces that terminate with mounting pads on which the battery 146 can be flip-chip mounted. The controller chip can also have interconnects ("leads") connected to the communication antenna 170 and the analyte bio-sensor 162. The controller chip may be disposed on a sensor chip that is flip-chip mounted over conductive mounting pads, for example. Such a controller operates to harvest energy received at the communication antenna 170, apply a voltage between the electrodes of the analyte bio-sensor 162 sufficient to develop an amperometric current, measure the amperometric current, and indicate the measured current via the communication antenna 170 (e.g., through the backscatter signals 171).

G. Example Eye-mountable Electronics Platform

Figure 2A:
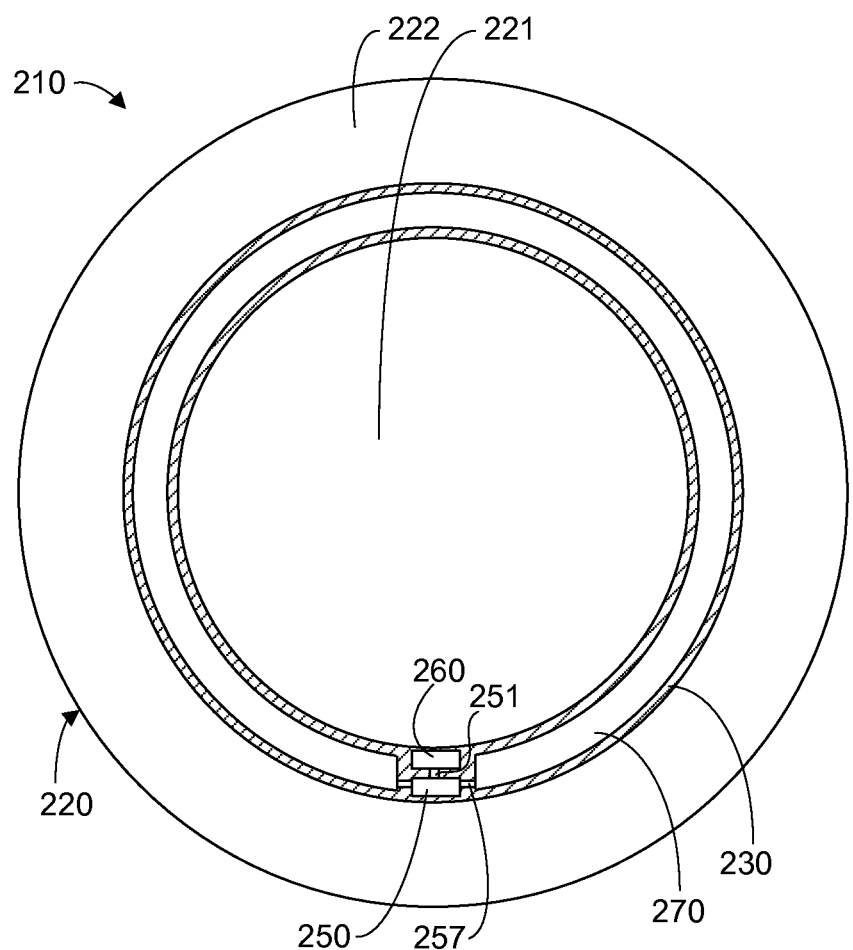
FIG. 2A is a bottom view of an example eye-mountable device.
Figure 2B:
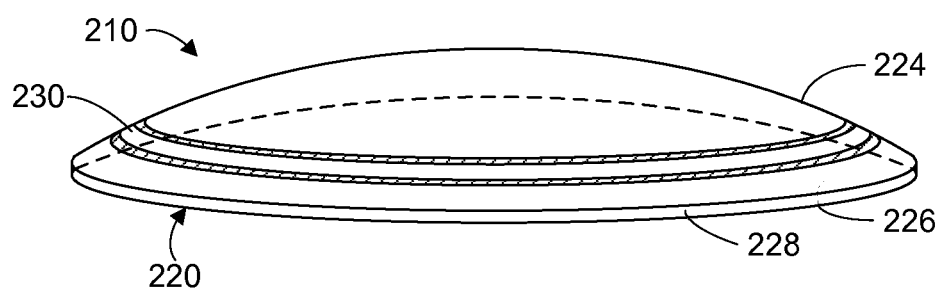
FIG. 2B is a side view of the example eye-mountable device shown in FIG. 2A.

FIG. 2A is a top view of an example eye-mountable device 210 (or ophthalmic electronics platform). FIG. 2B is an aspect view of the example eye-mountable device shown in FIG. 2A. It is noted that relative dimensions in FIGS. 2A and 2B are not necessarily to scale, but have been rendered for purposes of explanation only in describing the arrangement of the eye-mountable device 210. The eye-mountable device 210 can be formed of a polymeric material 220 shaped as a curved disk. The eye-mountable device 210 includes a loop antenna 270, a controller 250, and an electrochemical battery 260 mounted on a substrate 230 that is embedded in the polymeric material 220. The eye-mountable device 210 may also include an electrochemical sensor used to obtain a measurement of analyte concentration in tear film surrounding the eye-mountable device 210.

The polymeric material 220 can be a substantially transparent material to allow incident light to be transmitted to the eye while the eye-mountable device 210 is mounted to the eye. The polymeric material 220 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 220 can be formed with one side having a concave surface 226 suitable to fit over a corneal surface of an eye. The opposite side of the disk can have a convex surface 224 that does not interfere with eyelid motion while the eye-mountable device 210 is mounted to the eye. A circular outer side edge 228 connects the concave surface 226 and convex surface 224. The polymeric material 220 can be formed with a curved shape in a variety of ways. For example, techniques similar to those employed to form vision-correction contact lenses can be employed to form the polymeric material 220, such as heat molding, injection molding, spin casting, etc.

The eye-mountable device 210 can have dimensions similar to a vision correction and/or cosmetic contact lenses, such as a diameter of approximately 1 centimeter, and a thickness of about 0.1 to about 0.5 millimeters. However, these diameter and thickness values are provided for example purposes only. In some embodiments, the dimensions of the eye-mountable device 210 can be selected according to the size and/or shape of the corneal surface of the wearer's eye, to accommodate one or more components embedded in the polymeric material 220, and/or to achieve a target optical correction.

While the eye-mountable device 210 is mounted in an eye, the convex surface 224 faces outward to the ambient environment while the concave surface 226 faces inward, toward the corneal surface. The convex surface 224 can therefore be considered an outer, top surface of the eye-mountable device 210 whereas the concave surface 226 can be considered an inner, bottom surface. The "top" view shown in FIG. 2A is an illustration facing the convex surface 224.

The substrate 230 can be embedded in the polymeric material 220 so as to be situated along the outer periphery 222 of the polymeric material 220, away from the central region 221. The substrate 230 can be shaped as a flat, circular ring (e.g., a disk with a central hole). The flat surface of the substrate 230 (e.g., along the radial width) serves as a platform for mounting electronics such as chips (e.g., via flip-chip mounting) and for patterning conductive materials (e.g., via microfabrication techniques such as photolithography, deposition, plating, etc.) to form electrodes, antenna (e), mounting pads, and/or interconnections. Both the substrate 230 and the polymeric material 220 can be approximately cylindrically symmetric about a common central axis. The substrate 230 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 230 can be implemented to assume a variety of different form factors, similar to the discussion of the substrate 130 in connection with FIG. 1 above.

The controller 250 can be a chip including logic elements configured to operate an electrochemical sensor and the loop antenna 270. The controller 250 (and any other electronics on the substrate 230) can receive power from the electrochemical battery 260. The controller 250 is electrically connected to the loop antenna 270 by interconnects 257 also situated on the substrate 230. Similarly, the controller 250 is electrically connected to the electrochemical battery 260 by interconnects 251. The interconnects 251, 257, the loop antenna 270, and conductive electrodes included in the electrochemical battery 260 can be formed from conductive materials patterned on the substrate 230 by a process for precisely patterning such materials, such as deposition, photolithography, etc. The interconnects 251 that electrically couple the electrochemical battery 260 to the controller 250 may include traces that terminate with a pair of conductive mounting pads. The electrochemical battery 260 may then be flip-chip bonded over the mounting pads to thereby electrically couple the electrochemical battery 260 to the electronics in the eye-mountable device 210. The conductive materials patterned on the substrate 230 can be, for example, gold, platinum, palladium, titanium, carbon, aluminum, copper, silver, silver-chloride, conductors formed from noble materials, metals, combinations of these, etc.

The loop antenna 270 is a layer of conductive material patterned along the flat surface of the substrate to form a flat conductive ring. In some examples, to allow additional flexibility along the curvature of the polymeric material, the loop antenna 270 can include multiple substantially concentric sections electrically joined together in parallel or in series. Each section can then flex independently along the concave/convex curvature of the eye-mountable device 210. In some examples, the loop antenna 270 can be formed without making a complete loop. For instance, the loop antenna 270 can have a cutout to allow room for the controller 250 and the electrochemical battery 260, as illustrated in FIG. 2A. However, the loop antenna 270 can also be arranged as a continuous strip of conductive material that wraps entirely around the flat surface of the substrate 230 one or more times, and such strips can be connected in parallel and/or series to achieve desired signal performance. For example, a strip of conductive material with multiple windings can be patterned on the side of the substrate 230 opposite the controller 250 and the electrochemical battery 260. Interconnects between the ends of such a wound antenna (e.g., the antenna leads) can then be passed through the substrate 230 to the controller 250.

Figure 2D:
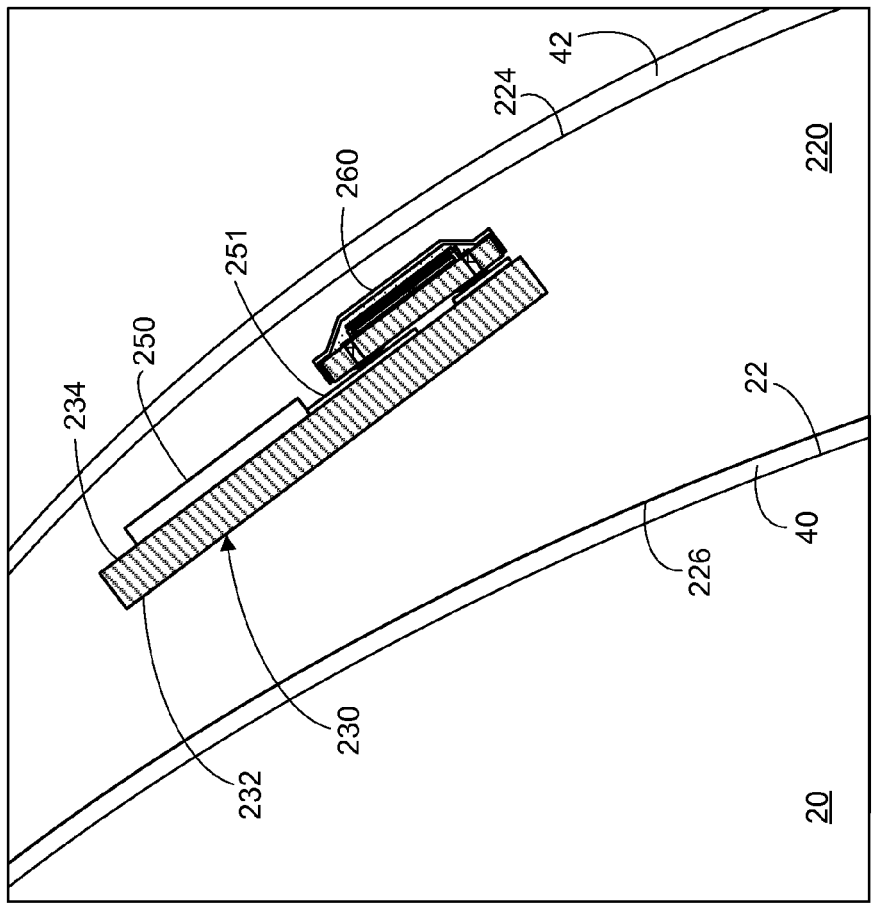
FIG. 2D is a close-in side cross-section view of the example eye-mountable device shown in FIGS. 2A and 2B while mounted to a corneal surface of an eye.
Figure 2C:
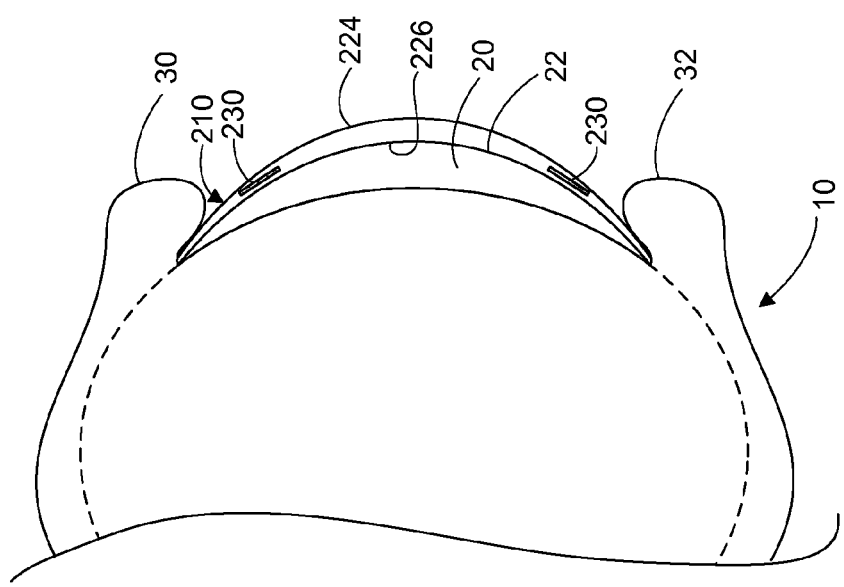
FIG. 2C is a side cross-section view of the example eye-mountable device shown in FIGS. 2A and 2B while mounted to a corneal surface of an eye.

FIG. 2C is a side cross-section view of the example eye-mountable device 210 while mounted to a corneal surface 22 of an eye 10. FIG. 2D is a close-in side cross-section view enhanced to show the tear film layers 40, 42 surrounding the surfaces 224, 226 of the example eye-mountable device 210. It is noted that relative dimensions in FIGS. 2C and 2D are not necessarily to scale, but have been rendered for purposes of explanation only in describing the arrangement of the example eye-mountable device 210. For example, the total thickness of the eye-mountable device 210 can be about 100-200 micrometers, while the thickness of the tear film layers 40, 42 can each be about 10 micrometers, although this ratio may not be reflected in the drawings. Some aspects are exaggerated to allow for illustration and to facilitate explanation.

The eye 10 includes a cornea 20 that is covered by bringing the upper eyelid 30 and lower eyelid 32 together over the top of the eye 10. Incident light is received by the eye 10 through the cornea 20, where light is optically directed to light-sensing elements of the eye 10 (e.g., rods and cones, etc.) to stimulate visual perception. The motion of the eyelids 30, 32 distributes a tear film across the exposed corneal surface 22 of the eye 10. The tear film is an aqueous solution secreted by the lacrimal gland to protect and lubricate the eye 10. When the eye-mountable device 210 is mounted in the eye 10, the tear film coats both the concave surface 226 and the convex surface 224 with an inner tear film layer 40 (along the concave surface 226) and an outer tear film layer 42 (along the convex layer 224). The tear film layers 40, 42 can be about 5 to 10 micrometers in thickness and together account for about 5 to 10 microliters.

The tear film layers 40, 42 are distributed across the corneal surface 22 and/or the convex surface 224 by motion of the eyelids 30, 32. For example, the eyelids 30, 32 may raise and lower, respectively, to spread a small volume of tear film across the corneal surface 22 and/or the convex surface 224 of the eye-mountable device 210. The tear film layer 40 on the corneal surface 22 also facilitates mounting the eye-mountable device 210 by capillary forces between the concave surface 226 and the corneal surface 22.

As shown in the cross-sectional views in FIGS. 2C and 2D, the substrate 230 can be inclined such that the flat mounting surfaces of the substrate 230 are approximately parallel to an adjacent portion of the convex surface 224. The substrate 230 can be a flattened ring with an inward-facing surface 232 (closer to the concave surface 226 of the polymeric material 220) and an outward-facing surface 234 (closer to the convex surface 224). The substrate 230 can have electronic components and/or patterned conductive materials mounted to either or both mounting surfaces 232, 234. As shown in FIG. 2D, the electrochemical battery 260, controller 250, and conductive interconnect 251 are mounted on the outward-facing surface 234. In particular, the electrochemical battery 260 is mounted on a pair of conductive mounting pads disposed on the outward-facing surface 234. The mounting pads are aligned with corresponding terminals on the electrochemical battery 260, one of which is electrically coupled to an anode of the electrochemical battery 260, the other of which is electrically coupled to a cathode of the electrochemical battery 260. Other electronics, electrodes, etc. situated on the substrate 230 may be mounted to either the inward-facing surface 232 or the outward-facing surface 234. Moreover, in some embodiments, some electronic components can be mounted on one surface (e.g., the inward-facing surface 232), while other electronic components are mounted to the opposing surface (e.g., the outward-facing surface 234), and connections between the two sides can be made through conductive materials passing through the substrate 230. For example, an electrochemical analyte sensor may be disposed on the substrate 230 and electrically coupled to the controller 250 via interconnects patterned on the substrate 230. The controller 250 can use the electrochemical sensor to obtain measurements of tear film analyte concentration by applying a voltage to the electrodes of the electrochemical sensor and monitoring the resulting amperometric current through the working electrode. The controller 250 can then use the loop antenna 270 to indicate the measured current.

The electrochemical battery 260 includes two electrodes: an anode and a cathode. The anode and the cathode can be separated by an electrolyte which transfers ions during charge or discharge of the electrochemical battery 260. The transfer of ions through the electrolyte is balanced by electrons conveyed between the electrodes through the connected circuit. The resulting current flow through the external circuit during battery discharge. During a charge operation, the electrochemical battery 260 drains current from the external circuit. The electrochemical battery 260 may be implemented on a battery substrate separate from the substrate 230. For instance, the electrochemical battery 260 can have electrodes interposed by an electrolyte patterned on one side of the battery substrate, and each electrode can be connected to a conductive pad on the reverse side of the battery substrate. The electrochemical battery 260 can then be mounted over corresponding conductive pads formed on the substrate 230. In other examples, a battery may be formed directly on the substrate 230 and interconnected with other electronics on the same substrate.

III. Example Thin Film Batteries

Figure 3A:
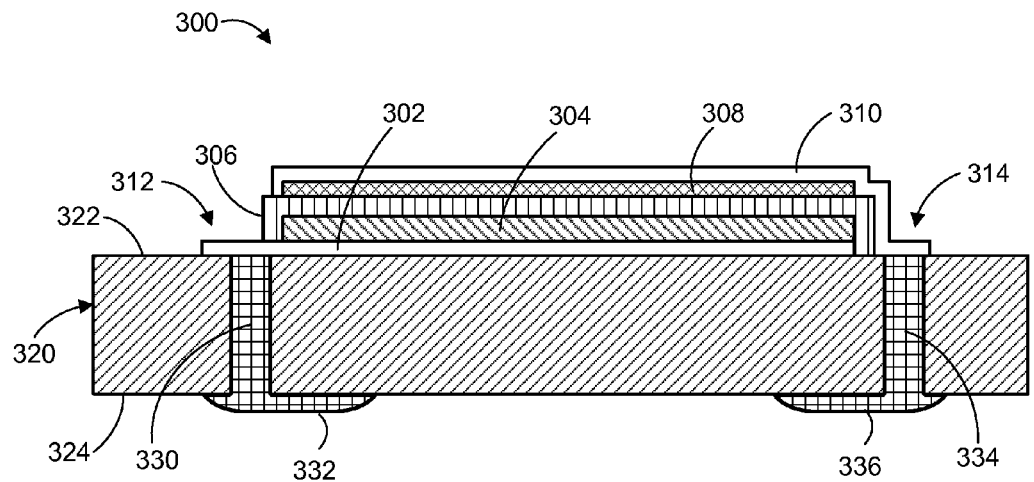
FIGS. 3A and 3B are side cross-section views of example solid state batteries.
Figure 3B:
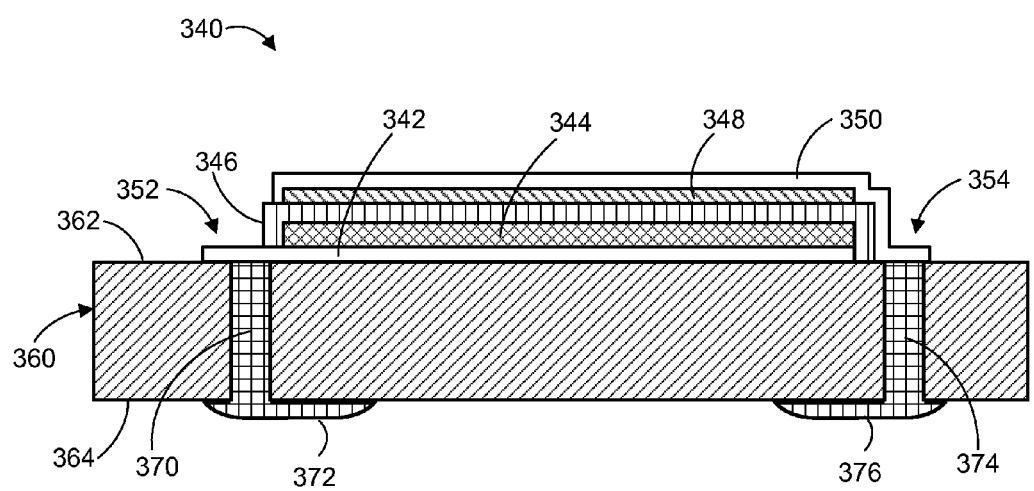

FIG. 3A illustrates an example arrangement for a thin film battery 300. FIG. 3B illustrates another example arrangement for a thin film battery 340. To illustrate internal structures, FIGS. 3A and 3B show cross-sectional views of the batteries 300, 340. The arrangements illustrated by FIGS. 3A and 3B are not drawn to scale and are rendered so as to facilitate understanding. For example, some aspects may be exaggerated to facilitate illustration. The batteries 300, 340 can be included in an eye-mountable device for detecting a tear film concentration of an analyte (e.g., the eye-mountable device 210 described in connection with FIGS. 2A-2D above), in a body-mountable or implantable device, or in another electronic device with a relatively thin form factor and/or size/weight constraints.

Referring to FIGS. 3A and 3B, the batteries 300, 340 may be solid state batteries that are formed by films of electrode material separated by an electrolyte film. The layered films may be formed by deposition, evaporation, and/or other microfabrication techniques, and the composition of each film can be selected to provide particular battery chemistries. For instance, in a lithium ion solid state battery, the electrolyte layer may be formed of lithium phosphorus oxynitride (LIPON) (e.g., formed by sputtering with a lithium orthophosphate target); the cathode may be formed of lithium cobalt oxide ($LiCoO_2$) and the anode may be formed of lithium metal. Other examples of electrode and electrolyte film materials are also possible. In addition, the two electrode films can have a conductive layer opposite the electrolyte film to conduct current between the electrodes and an external circuit. Such thin film batteries may be formed by layering materials over a substrate beginning with the cathode (as in FIG. 3A) or beginning with the anode (as in FIG. 3B). The batteries 300, 340 are described below with reference to example processes of formation, although the assembled arrangements may be formed by other fabrication techniques and the disclosed battery arrangements are not limited to any one particular fabrication technique. In addition, the dimensional extent and/or thickness of each layer of the battery may be selected, at least in part, to achieve a desired energy storage capacity and/or power delivery capacity. In some cases, batteries disclosed herein may be designed to provide between about 1 μAh and about 5 μAh, although other values are also possible. Moreover, in some applications, one or more battery cells may be connected to one another in series or in parallel to achieve a desired energy storage capacity and/or power delivery capacity. Thus, example layer thicknesses noted below are provided for example purposes only.

Referring to FIG. 3A, the battery 300 is disposed on a substrate 320 which has a first side 322 and a second side 324. The substrate 320 can be a silicon-based material such as a silicon wafer or a mica substrate, a ceramic or metal substrate, or a polymeric substrate such as polyethylene terephthalate (PET), polyimide, parylene, or another plastic substrate. Depending on fabrication constraints, the substrate 320 may be selected based on tolerance to various annealing temperatures, such as temperatures up to 800° C. The substrate 320 can have a thickness sufficient to provide structural stability to the battery during handling and fabrication, but may be less than 100 micrometers in thickness. For instance, the substrate may be a silicon wafer polished to a thickness between about 20 micrometers and about 50 micrometers. In some applications, the thickness of the substrate 320 is selected such that the total thickness of the fabricated battery is less than 100 micrometers, for example.

A cathode current collector layer 302 can be disposed on the first side 322 of the substrate 320. In some examples, the first side 322 of the substrate 320 may be prepared by polishing and/or cleaning the first side 322 to provide a surface that is free of contaminants and in a desired form factor (e.g., substantially planar). The first side 322 may optionally be coated with a passivation layer such as an insulating film. A passivation layer may be used to prevent potential conduction through the substrate 320, such as may occur in conductive or semi-conductive substrate material. The cathode current collector layer 302 can be sputter deposited in a desired pattern (e.g., using photoresists, masks, etc.) to occupy a first area of the first side 322. The cathode current collector layer can be formed of a conductive material such as titanium, cobalt, gold, molybdenum, platinum, palladium, another metal, combinations of these, etc. The cathode current collector layer 302 may have a thickness between about 300 angstroms and about 500 angstroms (i.e., 30-50 nanometers).

A film of cathode material 304 can be disposed over the cathode current collector layer 302. The cathode material 304 can be patterned (e.g., in a deposition process) so as to be substantially only over the cathode current collector layer 302 (e.g., using resists, masks, etc.). For instance, if the cathode current collector layer 302 occupies a particular region of the first side 322, the cathode material 304 may be entirely disposed within that same region. The cathode material 304 can be a material which reduces lithium ions transferred from the anode. For example, the cathode material 304 can include lithium cobalt oxide ($LiCoO_2$), or another lithium salt, metal salt, or cobalt oxide salt. The cathode material 304 may have a thickness between about 1 micrometer and about 10 micrometers. The energy density of the cathode material can be increased after deposition by annealing the cathode material 304 (and substrate), which causes the material to crystallize in an arrangement favorable for receiving lithium. For example, a $LiCoO_2$ film may be annealed at a temperature between about 500° C. and about 800° C. Other techniques may be used to achieve crystallization. For instance, in examples in which the substrate material 320 cannot withstand a high annealing temperature, the cathode material 304 may be crystallized using laser annealing or by exposing the cathode material to argon and oxygen plasma; bombardment with reactive oxygen ions can then crystallize the cathode material 304 without heating the substrate 320.

A film of electrolyte material 306 can be disposed over the cathode material 304. The film of electrolyte material may be sputter deposited over the cathode material 304. The electrolyte material 306 can be a layer of material such as lithium phosphorous oxynitride (LIPON). The electrolyte material 306 can have a thickness between about 1.5 micrometers and about 3 micrometers. The electrolyte may also be annealed to achieve a target energy state of the electrolyte (e.g., LIPON may be annealed at about 250° C.). To form the electrolyte film, LIPON can be sputter deposited using a target of lithium orthophosphate, and can be patterned in a region that overlaps the cathode material 304. As shown in FIG. 3A, the electrolyte material 306 may fully encapsulate the cathode material 304 between the cathode current collector layer 302 and the electrolyte material 306. For instance, the electrolyte material 306 can be patterned in a region that includes the entirety of the cathode material 304 and also extends beyond the side edges of the cathode material 304. As such, the cathode material 304 can only receive electrical connections through the electrolyte material 306 or through the cathode current collector layer 302.

A film of anode material 308 can be disposed over the electrolyte material 306. The anode material 308 may be evaporated lithium metal and can have a thickness of about 2 to about 3 micrometers. The anode material 308 can be patterned over a region that is entirely within the area occupied by the electrolyte material 306. Because the electrolyte material 306 overlaps the cathode material 304, the cathode material 304 is separated from the anode material 308 at all locations by the electrolyte material 306, and no direct contact is made between the anode material 308 and the cathode material 304.

An anode current collector layer 310 can be disposed over the anode material 308. The anode current collector layer can be a layer of conductive material (similar to the cathode current collector layer), but the anode current collector layer 310 can extend beyond the region occupied by the anode material 308, the electrolyte material 306, the cathode material 304, and the cathode current collector 302. Thus, the anode current collector layer 310 can be patterned as a continuous strip of conductive material that is disposed over the anode material 308 and also makes contact with a region of the first side 322 of the substrate 320 that is not occupied by the cathode current collector layer 302. In some embodiments, the areas on the first side 322 of the substrate 320 occupied by the cathode current collector layer 302 and the anode current collector layer 310 may be separated from one another by an insulator (e.g., to prevent direction conduction between the cathode and anode current collectors). In FIG. 3A, the two current collector layers 302, 310 are separated by a portion of the electrolyte material 306 that contacts the first side 322 of the substrate 320.

The assembled battery stack of layered electrodes and electrolyte material can be coupled to an external circuit via connection with the two current collector layers 302, 310 at respective terminals 312, 314. The terminals 312, 314 may be integrally formed portions of the current collector layer that are conveniently accessible for forming interconnections with the battery. For instance, conductive traces or other interconnects may be connected on the first side 322 at the cathode terminal 312 and the anode terminal 314. Additionally or alternatively, as shown in FIG. 3A, vias 330, 334 can be formed through the substrate 320 aligned with each of the connection terminals 312, 314. The vias 330, 334 can be apertures through the substrate formed by laser ablation, deep reactive ion etching, or another process, that are at least partially filled with conductive material. The conductive material within the vias 330, 334 thereby provide electrical paths between each of the terminals 312, 314 and the second side 324 of the substrate 320.

Conductive mounting pads 332, 336 can be formed on the second side 324 of the substrate 320 over each of the vias 330, 334. For example, a first mounting pad 332 (on the second side 324) can be electrically coupled to the cathode current collector layer 302 (on the first side 322) through the first via 330, and a second mounting pad 336 (on the second side 324) can be electrically coupled to the anode current collector layer 310 (on the first side 322) through the second via 334. The mounting pads 332, 336 can be patterned on the second side 324 in any non-overlapping manner. For instance, each of the mounting pads 332, 336 may occupy substantially half of the second side 324 of the substrate 320. The assembled thin film battery 300 can then be electrically coupled to another circuit by flip-chip mounting the mounting pads 332, 336 over corresponding terminals.

Referring to FIG. 3B, the thin film battery 340 is disposed on a substrate 360 which has a first side 362 and a second side 364. An anode current collector layer 342 is disposed on the first side 362 of the substrate 360. A film of anode material 344 is disposed over the anode current collector layer 342. A film of electrolyte material 346 is disposed over the anode material 344. A firm of cathode material 348 is disposed over the electrolyte material 346. And a cathode current collector layer 350 is disposed over the cathode material 348. The current collector layers, electrode films, and electrolyte film in FIG. 3B can be the same or similar to the current collector layers, electrode films, and electrolyte film described in connection with FIG. 3A. However, because the anode material 344 and electrolyte material 346 are disposed on the substrate 360 prior to the cathode material 348, the cathode material 348 may not undergo a high temperature annealing process. For example, the cathode material 348 may be crystallized by a process involving oxygen bombardment in argon oxygen plasma and/or laser annealing.

The assembled battery stack includes an anode terminal 352 and a cathode terminal 354 disposed on the first side 362 of the substrate 360. Vias 370, 374 through the substrate 360 electrically couple the anode terminal 352 and the cathode terminal 354 to respective conductive mounting pads 372, 376 formed on the second side 364 of the substrate 360.

The example arrangements described in connection with FIGS. 3A and 3B illustrate single battery cells (e.g., a single electrolyte in contact with a cathode, and an anode in contact with the electrolyte but not the cathode). In some examples, multiple solid state battery cells arranged in accordance with the thin film battery 300 or the thin film battery 340 may be formed on a common substrate (e.g., by patterning respective layers of current collector layers, electrode films, and electrolyte film). Vias and conductive mounting pads can be formed on an opposite side of the common substrate before or after formation of the battery cells. The individual battery cells can then be separated from one another by dicing the substrate or laser scribing the substrate. The individual batteries can then be integrated into electronics devices by flip-chip mounting the batteries onto corresponding conductive pads.

Forming multiple batteries on a common substrate offers several advantages during device fabrication. First, fabrication of the batteries is more efficient when multiple batteries are formed simultaneously using a common substrate that is then diced, because a single series of vacuum deposition operations can be used to fabricate multiple batteries. Second, because the batteries are fabricated separately from the electronics that they will be powering, the fabrication of those other electronics is not subject to constraints involved in the battery formation. For instance, battery fabrication may involve the use of high temperatures, harsh solvents, etc. In applications in which batteries are formed directly on a substrate with other electronics, those other electronics and substrate are subjected to the same conditions involved in battery fabrication, which may constrain selection of materials, order of processing steps, or other factors. Separating battery fabrication from the fabrication of other electronics, and then flip-chip mounting the individual batteries via pick and place operations is therefore more efficient and offers greater flexibility in selection of materials and operations.

IV. Example Sealed Thin Film Batteries

Figure 4A:
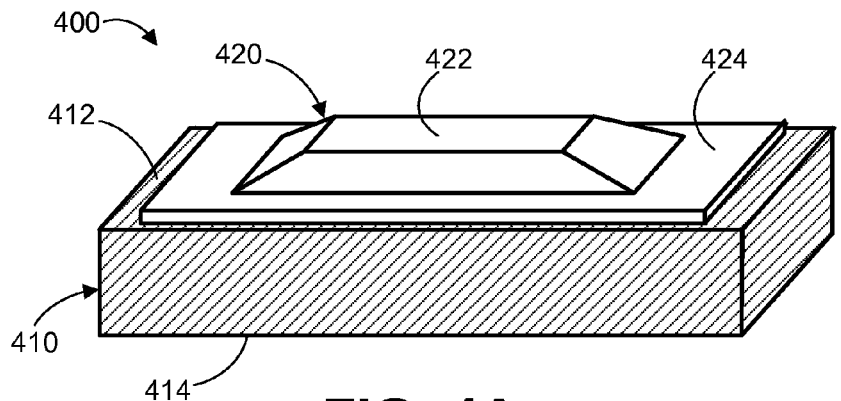
FIG. 4A is a top aspect view of an example solid state battery with a moisture barrier that terminates along a top surface of a substrate.
Figure 4B:
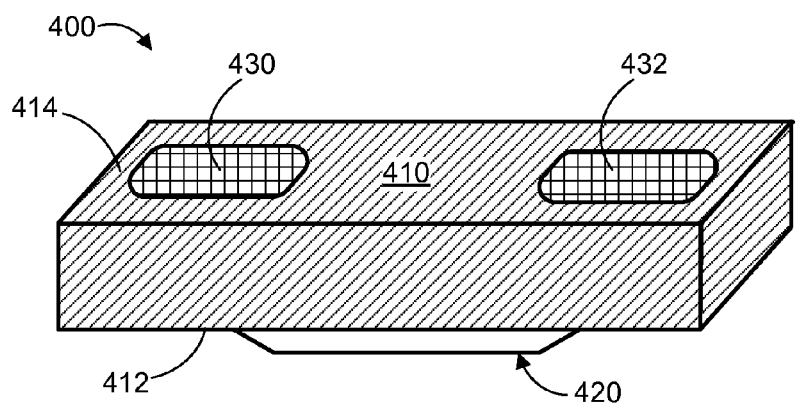
FIG. 4B is a bottom aspect view of the example solid state battery shown in FIG. 4A.
Figure 4C:
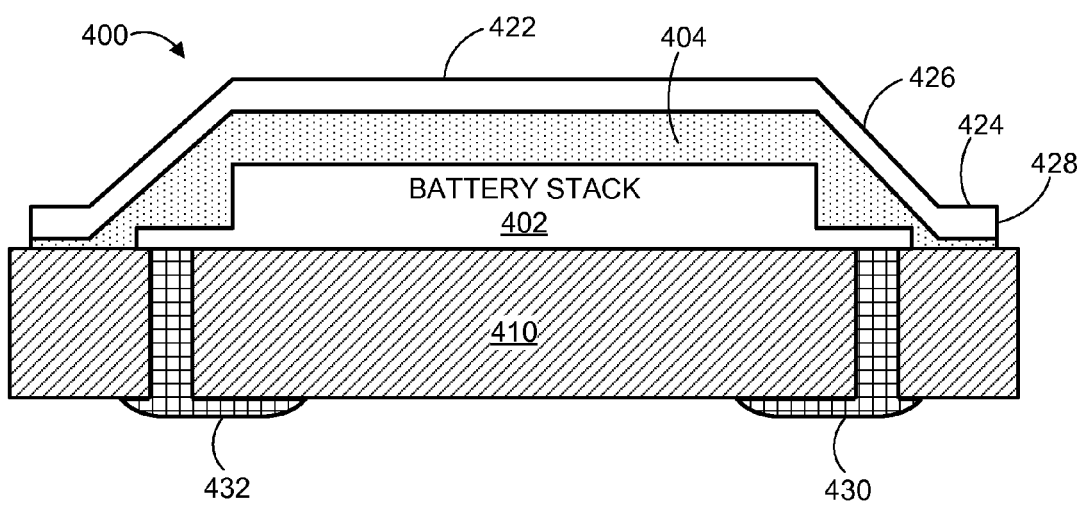
FIG. 4C is a side cross-section view of the example solid state battery shown in FIG. 4A.
Figure 5A:
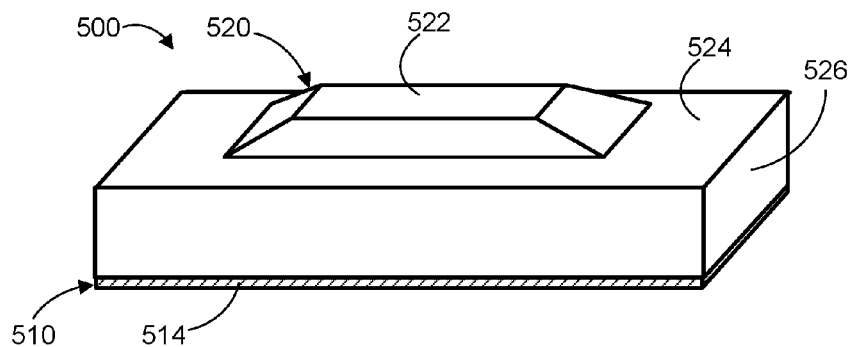
FIG. 5A is a top aspect view of an example solid state battery with a moisture barrier that terminates along a side surface of a substrate.
Figure 5B:
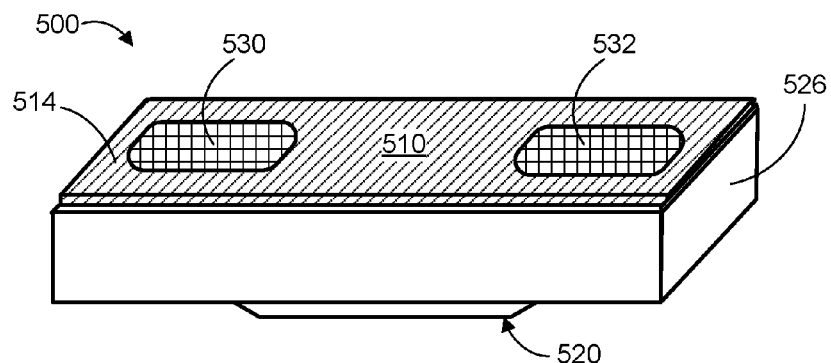
FIG. 5B is a bottom aspect view of the example solid state battery shown in FIG. 5A.
Figure 5C:
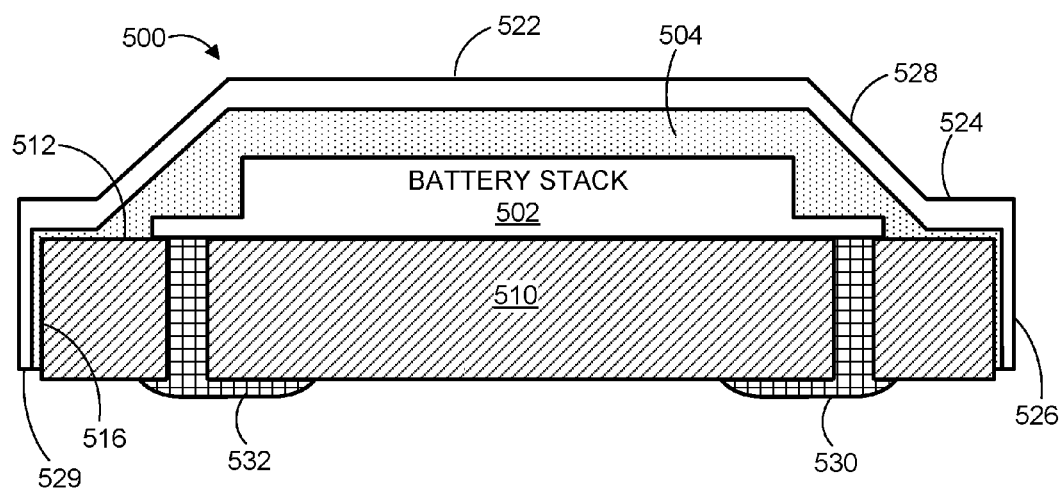
FIG. 5C is a side cross-section view of the example solid state battery shown in FIG. 5A.

FIGS. 4A, 4B, and 4C illustrate an example sealed battery 400. FIGS. 5A, 5B, and 5C illustrate another example sealed battery 500. The example sealed batteries described in FIGS. 4A-5C each include a battery cell disposed on a substrate.

The battery cell includes an electrolyte film in contact with a cathode film, and an anode film in contact with the electrolyte film but not in contact with the cathode film. The battery stack may take the form of either of the example thin film batteries 300, 340 described in connection with FIGS. 3A and 3B. Each of the sealed batteries also include a pair of conductive mounting pads situated on the opposite side of the substrate from the side the battery is disposed on, with one being electrically coupled to the cathode and the other electrically coupled to the anode. In addition, the example sealed batteries include polymeric sealant material that encapsulates the battery stack between the sealant material and the substrate, and a moisture barrier that is disposed on the sealant material.

FIG. 4A is a top aspect view of an example solid state battery 400 with a moisture barrier 420 that terminates along a first side 412 of a substrate 410. FIG. 4B is a bottom aspect view of the example solid state battery 400. FIG. 4C is a side cross-section view of the example solid state battery 400. The solid state battery 400 includes a substrate 410, a battery stack 402 disposed on the substrate 410, a polymeric sealant material 404 disposed over and around the battery stack 402, and a moisture barrier 420 disposed on the polymeric sealant material 404. The battery stack 402 is formed on a first side 412 of the substrate 410, whereas conductive mounting pads 430, 432 that are electrically coupled to the anode and cathode of the battery stack 402, respectively, are formed on the second side 414 of the substrate 410.

The polymeric sealant material 404 can be a low temperature polymeric formulation, such as a polymer that becomes deformable above a particular temperature (e.g., between about 100° C. and about 200° C.). For instance, the polymeric sealant material 404 may be a polyethylene material, a polyamide material, polypropylene material, or any other thermoplastic or thermosetting polymer. The polymeric sealant material 404 may be applied over and around the battery stack 402 by an applicator that spreads the polymeric sealant material 404 over and around the battery stack 402. The polymeric sealant material 404 can then conform over and around the sides of the battery stack 402 (e.g., by flowing) and create a continuous seal along the first side 412 of the substrate 410 that entirely surrounds the battery stack 402, which is disposed on the substrate 410. The polymeric sealant material 404 may also be applied by spin coating or spraying the polymeric sealant material 404 to form a continuous layer above and around the battery stack 402. Because the polymeric sealant material 404 can form a continuous layer that seals against the substrate 410 on all sides of the battery stack 402, the polymeric sealant material can encapsulate the battery stack 402 between the polymeric sealant material 404 and the first side 412 of the substrate 410. The polymeric sealant material 404 also provides a support for the moisture barrier 420 that is disposed thereon. Thus, the polymeric sealant material 404 creates a separation between the battery stack 402 and the moisture barrier 420. In some cases, moreover, the moisture barrier may be omitted, and the polymeric sealant material 404 may inhibit moisture from reaching the battery stack 402. In such examples, the polymeric sealant material 404 may be a biocompatible material such as parylene or another biocompatible material, and/or may be substantially resistant to water swelling.

The moisture barrier 420 is disposed on the polymeric sealant material 404 to inhibit moisture from reaching the polymeric sealant material 404 and the battery stack 402. In some examples, the moisture barrier 420 can be a metallic or ceramic layer that is deposited over the polymeric sealant material 404 by a sputtering process. In some examples, the moisture barrier 420 may be a flexible foil that is applied over the polymeric sealant material 404. As shown in FIG. 4C, the moisture barrier 420 can have a raised top region 422 that is approximately parallel to the substrate 410, a transition region 426 that trends toward the substrate 410 from the raised top region 422, and side edges 424 where the moisture barrier 420 is closest to the substrate 410. The moisture barrier terminates along the first side 412 of the substrate 410 at an outer edge 428. The raised top region 422 can approximately correspond to the region spanned by the battery stack 402 on the substrate 410. The moisture barrier 420 is a continuous film or foil that is substantially impervious to moisture, and so the only moisture that can reach the polymeric sealant material 404 must enter along the first side 412 of the substrate 410, immediately below the outer edge 428.

Some implementations of the solid state battery 400 may be fabricated so as to reduce the distance between the outer edge 428 and the first side 412 of the substrate 410 within fabrication limitations. Some techniques may involve compressing the side edges 424 against the substrate 410. Some techniques may involve, prior to sputtering the moisture barrier 420, removing some of the polymeric sealant material 404 from the substrate 410 so as to expose a continuous ring on the first side 412 of the substrate 410 that entirely surrounds the battery stack 402. The sputtered moisture barrier may then adhere directly against the first side 412 of the substrate 410 in the continuous ring.

In some examples, the moisture barrier 420 can be compressed against the substrate 410 by applying pressure around the side edges 424 thereof. The shape can be held, at least in part, by cooling the thermoplastic polymeric sealant material 404, which causes the polymeric sealant material 404 to harden, and thereby fix the shape of the moisture barrier 420. In some examples, the polymeric sealant material 404 may be formed to take a shape suitable for receiving a sputtered moisture barrier material (e.g., by applying a mold to the polymeric sealant material 404), and then the moisture barrier 420 can be sputtered onto the formed polymeric sealant material 404. Alternative techniques for applying the moisture barrier are also possible. Moreover, in some cases, the moisture barrier can be applied solely to the top surface of the moisture barrier in a layer that is substantially parallel to the plane of the substrate on which the battery stack is disposed.

FIG. 5A is a top aspect view of an example solid state battery 500 with a moisture barrier 520 that terminates along a sidewall 516 of a substrate 510. FIG. 5B is a bottom aspect view of the example solid state battery 500. FIG. 5C is a side cross-section view of the example solid state battery 500. The solid state battery 500 includes a substrate 510, a battery stack 502 disposed on the substrate 510, a polymeric sealant material 504 disposed over and around the battery stack 502, and a moisture barrier 520 disposed on the polymeric sealant material 504. The battery stack 502 is formed on a first side 512 of the substrate 510, whereas conductive mounting pads 530, 532 that are electrically coupled to the anode and cathode of the battery stack 502, respectively, are formed on the second side 514 of the substrate 510. The polymeric sealant material 504 can be the same or similar to the polymeric sealant material 404 described in connection with FIGS. 4A-4C.

The moisture barrier 520 is disposed on the polymeric sealant material 504 to inhibit moisture from reaching the polymeric sealant material 504 and the battery stack 502. The moisture barrier 520 may be shaped using any of the techniques described in connection with shaping the moisture barrier 420 described in FIGS. 4A-4C. But unlike the moisture barrier 420 described in FIGS. 4A-4C, the moisture barrier 520 forms a continuous moisture impermeable barrier that extends along at least a portion of the sidewalls 516 of the substrate 510. As shown in FIG. 5C, the moisture barrier 520 can have a raised top region 522 that is approximately parallel to the substrate 510, a transition region 528 that trends toward the substrate 510 from the raised top region 522, side edges 524 where the moisture barrier 520 is again approximately parallel to the substrate 510, and a transverse region 526 that extends along the sidewalls 516 of the substrate 510. The moisture barrier 520 terminates along the sidewalls 516 of the substrate 510 at an outer edge 529. The raised top region 522 can approximately correspond to the region spanned by the battery stack 502 on the substrate 510. The moisture barrier 520 is a continuous film or foil that is substantially impervious to moisture, and so the only moisture that can reach the polymeric sealant material 504 must enter along the sidewall 516 of the substrate 510, between the sidewall 516 and the outer edge 529.

Some implementations of the solid state battery 500 may be fabricated so as to reduce the distance between the outer edge 529 and the sidewall 516 of the substrate 510 within fabrication limitations. Some techniques may involve compressing the transverse region 526 against the sidewalls 516 of the substrate 510. Some techniques may involve, prior to sputtering the moisture barrier 520, removing some of the polymeric sealant material 504 from the substrate 510 so as to expose a continuous ring on the sidewalls 516 of the substrate 510 that entirely surrounds the battery stack 502. The sputtered moisture barrier may then adhere directly against the sidewalls 516 of the substrate 510 in the continuous ring.

The two example arrangements of sealed thin film batteries are provided for example purposes only. Many other form factors for sealed thin film batteries are possible. For example, some embodiments may include the use of non-planar substrates, (e.g., substrates with curved or irregular surfaces). A battery stack formed on such substrates can be surrounded by a conformal layer of polymeric sealant material and then a moisture barrier can be disposed on the polymeric sealant material so as to inhibit moisture from reaching the polymeric sealant material and the battery stack.

V. Example Sealed Battery Fabrication Processes

The sealed thin film batteries described herein may be formed by a variety of fabrication processes. Two example processes are described in connection with FIGS. 6A-7G. It is noted that the stages of fabrication illustrated in these figures are not drawn to scale and that the order of some stages may be interchanged in some examples and/or some stages may be omitted entirely. The sealed thin film batteries can be incorporated into body-mountable and/or implantable devices or other constrained form-factor devices, such as remote sensors, adhesives, clothing, etc. As noted further below, the sealed thin film batteries may be particularly advantageous in environments with moisture, because the moisture barrier prevents moisture from penetrating to the battery stack which could otherwise degrade the battery electrodes and/or electrolyte. For example, these batteries may be integrated into an eye-mountable device such as the eye-mountable device 210 described in FIG. 2 or another body-mountable device.

FIGS. 6A-6G describe a process in which conductive vias and mounting pads are formed on and within a substrate after the battery is already disposed on the opposite side of the substrate. FIGS. 7A-7G describe a process in which conductive vias and mounting pads are formed on and within a substrate before the battery is formed on the substrate. Variations and/or combinations of these approaches may also be used.

A. Forming Battery Stack, Followed by Vias Through Substrate

Figure 6A:
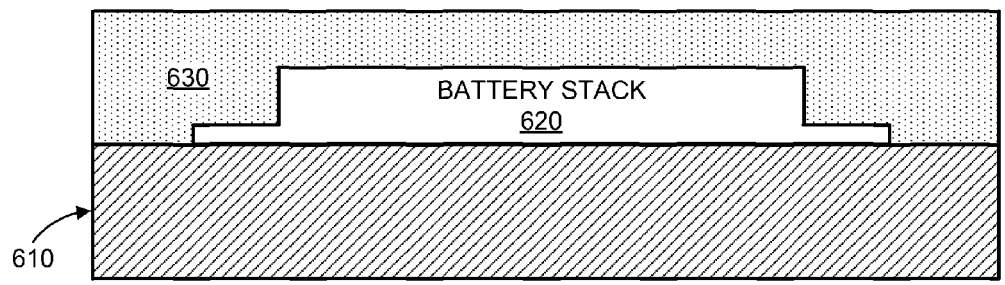
FIGS. 6A, 6B, 6C, 6D, 6E, 6F, and 6G illustrate stages of fabricating a sealed solid state battery and flip-chip mounting the battery, according to an example embodiment.

FIGS. 6A, 6B, 6C, 6D, 6E, 6F, and 6G illustrate stages of an example fabrication process for forming a sealed battery and mounting the battery in a device. The sealed battery shown in FIG. 6A includes a battery stack 620 disposed on a substrate 610. The battery stack 620 can be a thin film battery including films of anode material and cathode material separated from one another by a film of electrolyte material. For example, the battery stack 620 can be the same or similar to either of the battery stacks described in connection with FIGS. 3A and 3B. As shown in FIG. 6A, the battery stack 620 is disposed on the substrate 610 and encapsulated by a polymeric sealant material 630. The polymeric sealant material 630 can be a low temperature polymer that is applied over the battery stack 620 after fabricating the battery. The polymeric sealant material 630 may be coated over the battery stack 620 by physically applying the sealant material 630 using an applicator, by spin-coating the polymeric sealant, by spraying the polymeric sealant, and/or by other techniques. In examples where multiple batteries are formed on a common substrate and then separated by dicing or scribing the substrate, the batteries may be separated before applying the polymeric sealant material 630.

The polymeric sealant material 630 forms a conformal surrounding over the battery stack 620 that substantially encapsulates the battery stack 620 between the polymeric sealant material 630 and the substrate 610. In particular, in cases in which the battery stack 620 is electrically coupled to mounting pads situated on the opposite side of the substrate 610 (as shown in FIGS. 6D and 6E), the polymeric sealant material 630 can fully encapsulate the battery stack 620 without penetration by lead lines that connect to the electrodes. Instead, because vias through the substrate 610 obviate the need for terminals or lead lines on the same side of the substrate 610 as the battery stack 620, the polymeric sealant material 630 can fully surround the battery stack 620 and provide a continuous seal against the substrate 610, and thereby prevent contaminants from reaching the battery stack 620.

Figure 6B:
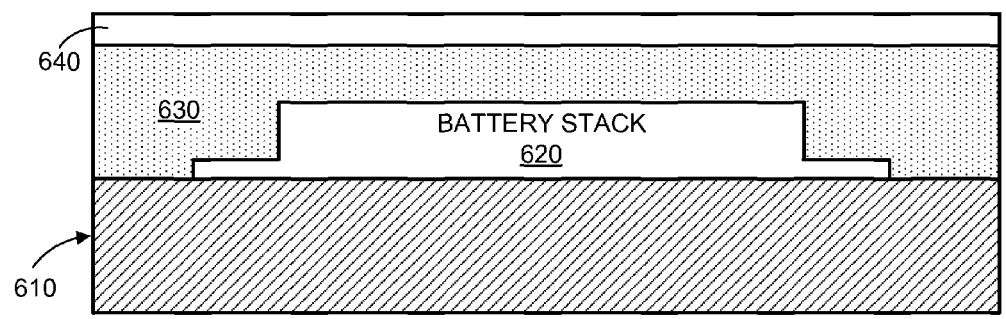

In FIG. 6B, the polymeric sealant material 630 is covered by a moisture barrier 640. The moisture barrier 640 may be a metallic or ceramic coating that is sputtered over the polymeric sealant material 630. In addition to encapsulating the battery stack 620, the polymeric sealant material 630 separates the battery stack 620 from the moisture barrier 640. The moisture barrier 640 provides a barrier to moisture and contaminants that is substantially impervious to moisture. The moisture barrier 640 thus helps prevent moisture from reaching the polymeric sealant material 630 and the battery stack 620. The moisture barrier 640 may therefore be helpful in preventing deleterious effects associated with moisture exposure. For example, while the polymeric sealant material 630 may be at least partially water permeable, the moisture barrier 640 of metallic or ceramic material can be substantially impermeable to water, and therefore prevent moisture from entering the polymeric sealant material 630 through the area covered by the moisture barrier 640.

Figure 6C:
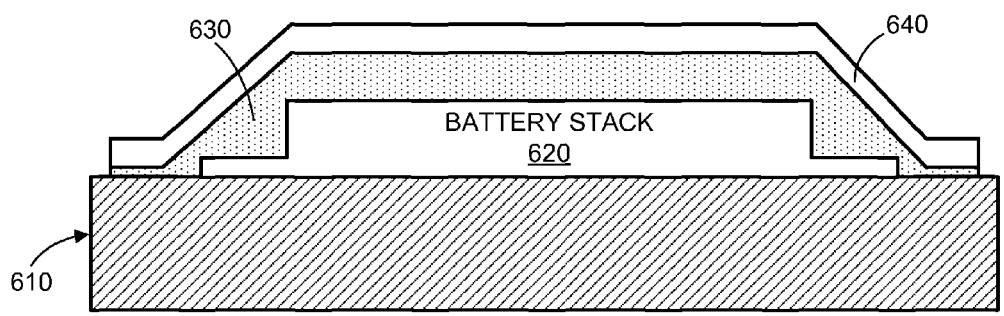
Figure 6D:
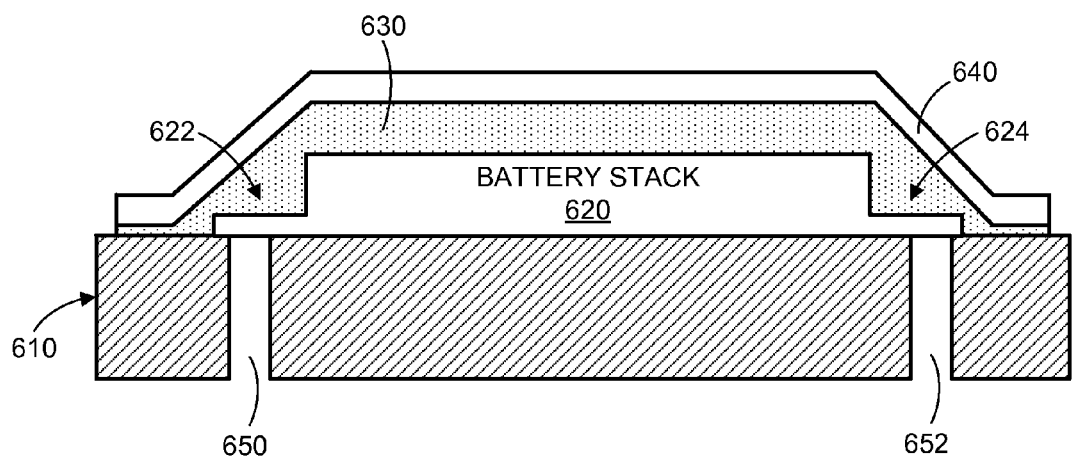
Figure 6E:
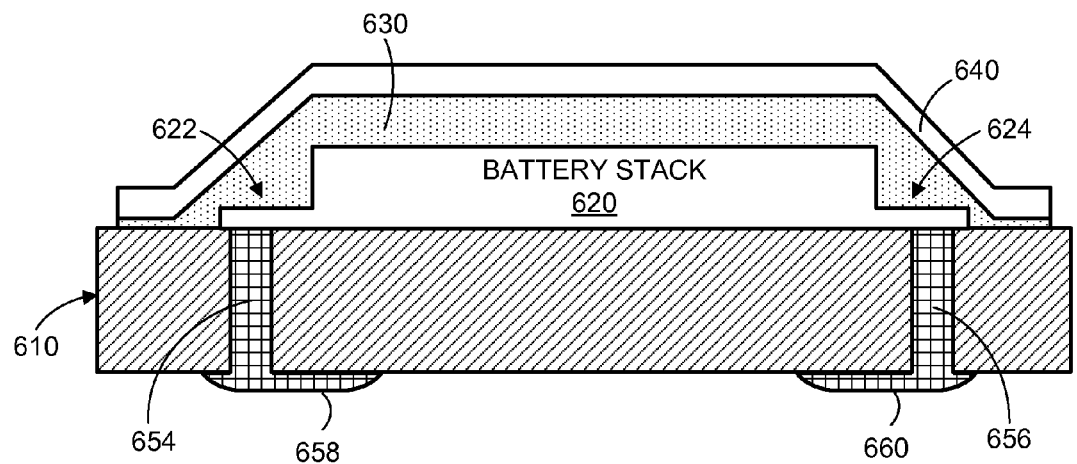

In FIG. 6C, the moisture barrier 640 is formed over the battery stack 620. The moisture barrier 640 may be formed by compressing the moisture barrier 640 (e.g., via a stamping process or by application of pressure). Compressing the moisture barrier can result in the outer edges of the moisture barrier 640 being depressed toward the substrate 610, as shown in FIG. 6C. The compression of the moisture barrier 640 also increases pressure on the polymeric sealant material 630, which may cause excess sealant material 630 to be forced under the outer edges of the moisture barrier 640. Depressing the outer area of the moisture barrier 640 closer to the substrate 610 also decreases the exposed surface area of the polymeric sealant material 630, which further reduces the through which moisture can reach the battery stack 620. In addition to forming the moisture barrier 640, compressing the moisture barrier 640 may also compress the polymeric sealant material 630 to better conform against the battery stack 620 and to help cure the sealant material 630. The sealant material 630 can thus create a separation (buffer) between the battery stack 620 and the moisture barrier 640, help increase the structural integrity of the assembled device, and also help prevent contaminants from reaching the battery stack 620.

Figure 5D:
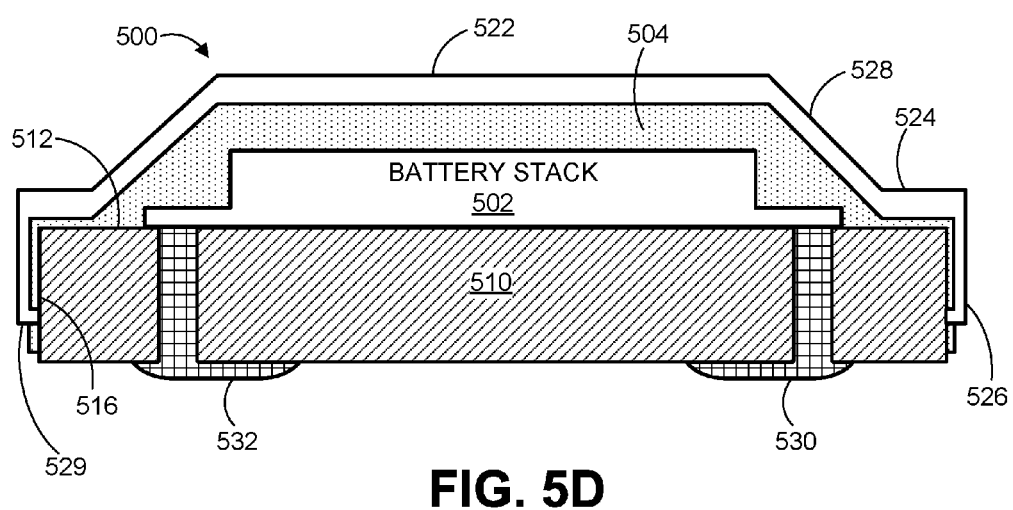
FIG. 5D is a side cross-section view of an example solid state battery.

Illustrated in FIG. 5D is an example embodiment of the battery 500 where the moisture barrier is adhered directly against the sidewalls 516 of the substrate 510 in a continuous ring.

In some examples, the moisture barrier 640 may be formed along the sides of the battery stack 620 and/or substrate 610 by an isotropic deposition process or another technique in addition to, or as alternative to, compressing the moisture barrier 640. Extending the moisture barrier 640 along the sides of the substrate 610 may create a more robust seal against moisture reaching the battery stack 620. Moreover, some examples may not include the moisture barrier at all. For example, the battery stack 620 can be encapsulated by the polymeric sealant material 630 without anything covering the sealant material 630. And in some examples, the moisture barrier may be formed only over the top surface of the sealant material 630 (e.g., as in the view shown in FIG. 6B).

The battery stack 620 can include a cathode terminal 622, which may be part of a layer of patterned conductive material electrically coupled to a cathode film within the battery stack 620. The battery stack 620 can also include an anode terminal 624, which may be part of a layer of patterned conductive material electrically coupled to an anode film within the battery stack 620. In FIG. 6D, two apertures 650, 652 are formed through the substrate 610 so as to expose the two terminals 622, 624 from the side of the substrate 610 opposite the battery stack 620. The apertures 650, 652 can be formed by deep reactive ion etching, laser ablation, or another process. For example, if the apertures 650, 652 are formed by deep reactive ion etching through the substrate 610, the terminals 622,624 may be used as etch stops. The apertures 650, 652 are aligned such that each exposes one of the electrodes of the battery (or a current collector electrically coupled to one of the electrodes). For example, the aperture 650 can be aligned to expose the cathode terminal 622 and the aperture 652 can be aligned to expose the anode terminal 624. In some examples, the apertures 650, 652 may be formed prior to application of the polymeric sealant material 630 and/or moisture barrier 640.

FIG. 6E shows the apertures 650, 652 occupied by conductive material 654, 656 and mounting pads 658, 660 formed on the opposite side of the substrate 610. The conductive material 654, 656 may be formed by depositing a seed layer along the sidewalls of the apertures 650, 652 and electroplating a conductive material to form a continuous conductive path through the substrate 610. The conductive mounting pads 658, 660 can be patterned onto non-overlapping areas of the opposite side of the substrate 610, and each mounting pad can be electrically coupled to one of the vias having conductive material 654, 656. The conductive material 654 electrically couples the cathode terminal 622 to the conductive mounting pad 658; and the conductive material 656 electrically couples the anode terminal 624 to the conductive mounting pad 660.

Figure 6F:
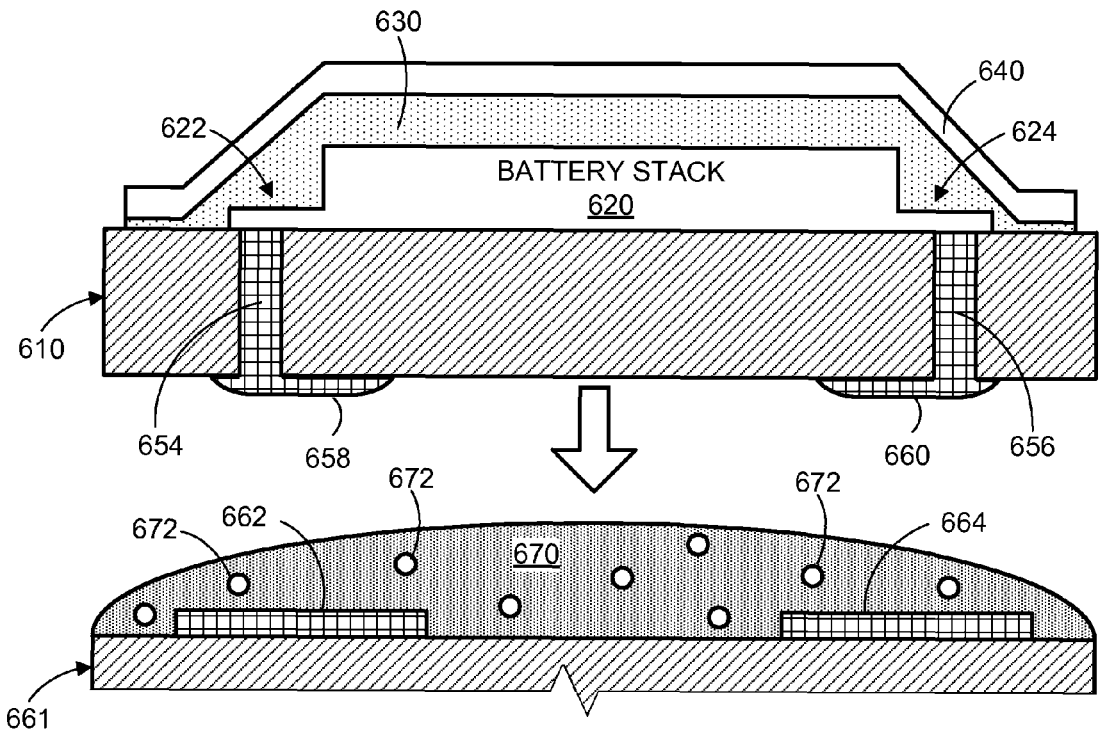
Figure 6G:
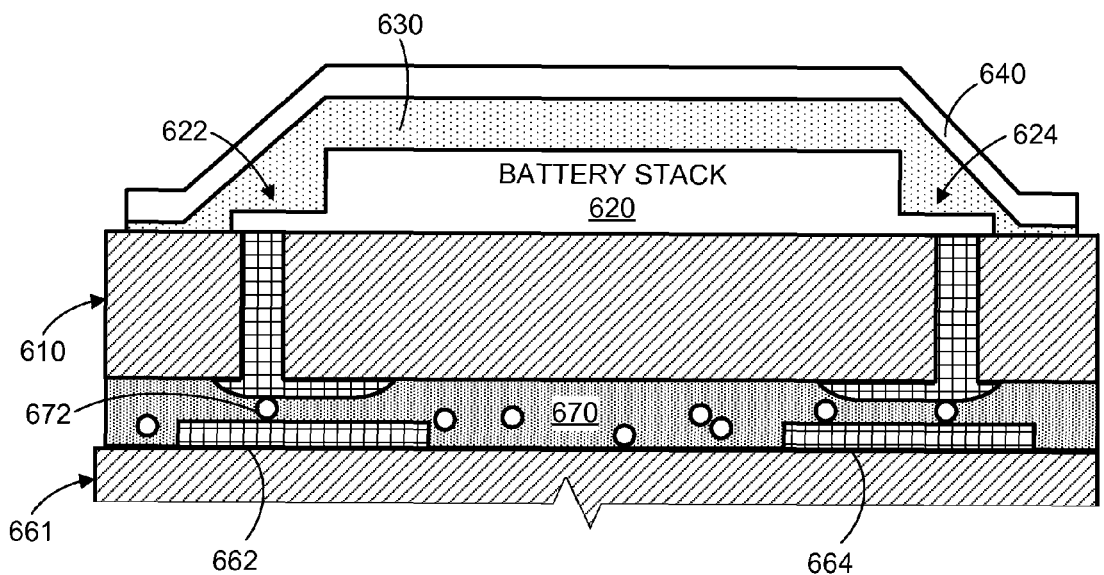

FIG. 6F illustrates the assembled battery being mounted to bonding terminals 662, 664 on another substrate 661. The bonding terminals 662, 664 can be electrically coupled to other electronics disposed on the substrate 661, such as control chips, etc., via traces and interconnects patterned on the substrate 661. An anisotropic conductive adhesive material 670, such as anisotropic conductive paste or anisotropic conductive film, can be applied over the bonding terminals 662, 664 and the battery can be placed over the bonding pads 662, 664. The anisotropic conductive material 670 can include multiple conductive particles 672 distributed within an adhesive matrix. When the battery is pressed against the substrate 661, as shown in FIG. 6G, at least one of the conductive particles 672 is lodged between the conductive mounting pad 658 and bonding terminal 662, and at least one other conductive particle 672 is lodged between the conductive mounting pad 660 and the bonding terminal 664. The conductive particles 672 thereby provide electrical conductivity along the direction that the two terminals are pressed together, but not otherwise, because the conductive particles 672 remain too far apart from one another to create a conductive path.

The placement and alignment of the battery over the bonding terminals 662, 664 can be accomplished by, for example, using a tool to position the battery such that the cathode-connected conductive mounting pad 658 is aligned with the first bonding terminal 662 and the anode-connected conductive mounting pad 660 is aligned with the second bonding terminal 664. The battery can then be moved toward the bonding terminals 662, 664 to deform the anisotropic conductive adhesive material 670 and electrically couple the conductive mounting pads 658, 660 to the bonding terminals 662, 664. Application of pressure and/or heat can cure the anisotropic conductive adhesive 670 which fixes the battery in place and completes the flip-chip bonding process.

B. Forming Vias Through Substrate, Followed by Battery Stack Formation

Figure 7A:
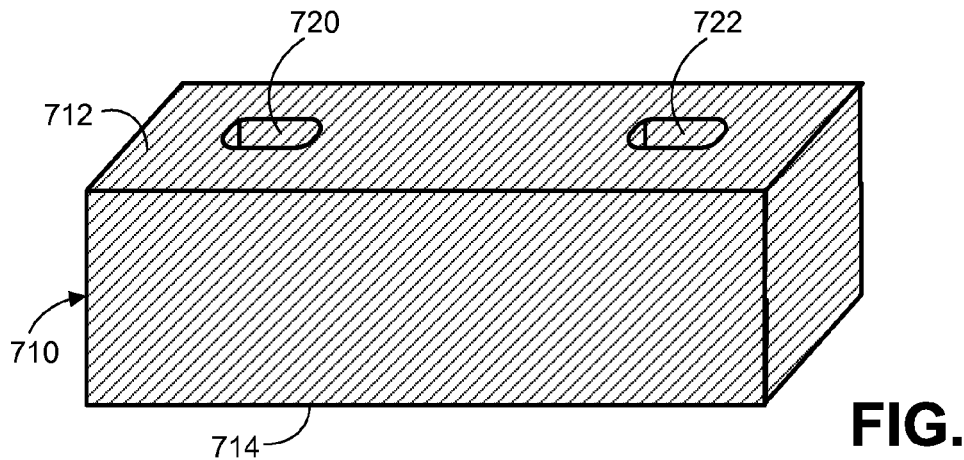
FIGS. 7A, 7B, 7C, 7D, 7E, 7F, and 7G illustrate stages of fabricating a sealed solid state battery and flip-chip mounting the battery, according to an example embodiment.

FIGS. 7A, 7B, 7C, 7D, 7E, 7F, and 7G illustrate another example fabrication process for a sealed battery. FIG. 7A shows a substrate 710 having a first side 712 and a second side 714. A pair of holes 720, 722 (or a pair of depressions) is formed in the first side 712 of the substrate 710. The holes 720, 722 can be formed by laser ablation, deep reactive ion etching, or another technique. The holes 720, 722 can penetrate to a depth greater than the eventual thickness of the substrate 710, after thinning Thus, once thinned, the two holes 720, 722 will extend through the entire thickness of the substrate 710. The holes 720, 722 may also extend entire through the substrate 710 (i.e., to the second side 714). The holes 720, 722 may have sidewalls that are substantially perpendicular to the first side 712 (and second side 714), which provide the shortest path through the substrate 710.

Figure 7B:
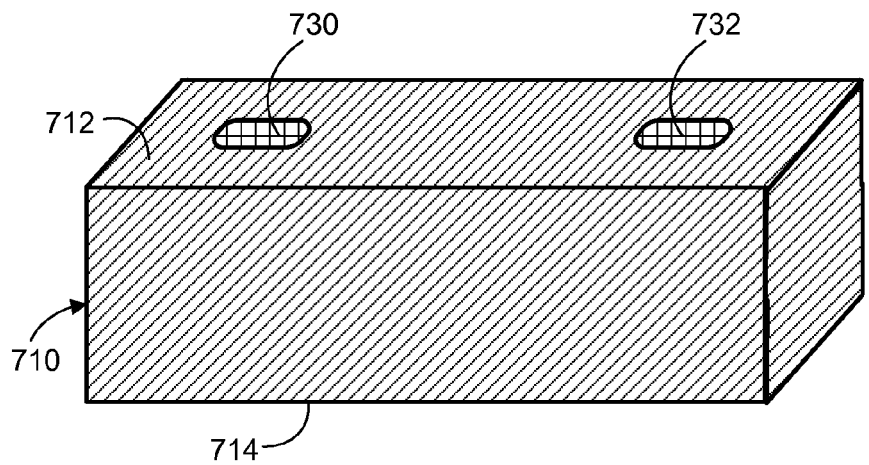
Figure 7C:
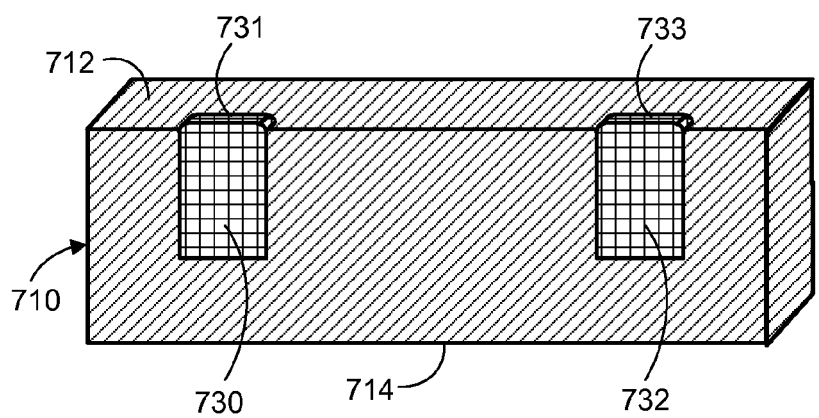
Figure 7D:
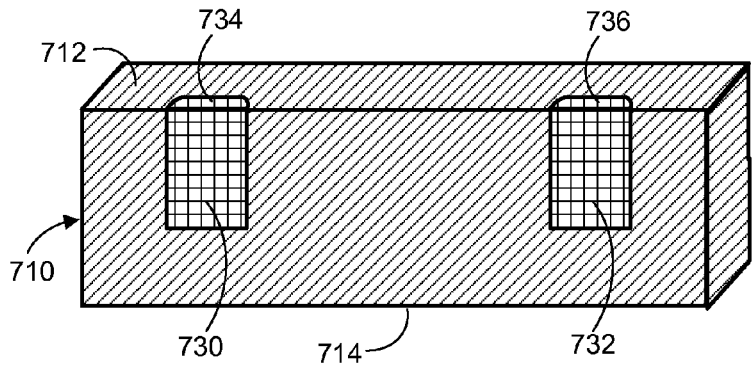

FIG. 7B shows the two holes 720, 722 after being filled by a conductive material 730, 732. For example silver, tin, gold, copper, or another metal can be electroplated onto the sidewalls to create a continuous electrical pathway from the first side 712 of the substrate 710 to the distal end of each of the holes 720, 722. FIG. 7C shows a cutaway view of the holes 720, 722 occupied by conductive material 730, 732. After filling the holes 720, 722 with conductive material 730, 732, respective top sides of the conductive material may extend beyond the plane of the first side 712 of the substrate 710 (e.g., the protrusions 731, 733). FIG. 7D shows a cutaway view after polishing the protrusions 731, 733 and/or the first side 712 of the substrate 710. Polishing removes the protrusions and creates a pair of terminals 734, 736, which are co-planar with the first side 712 of the substrate 710.

Figure 7E:
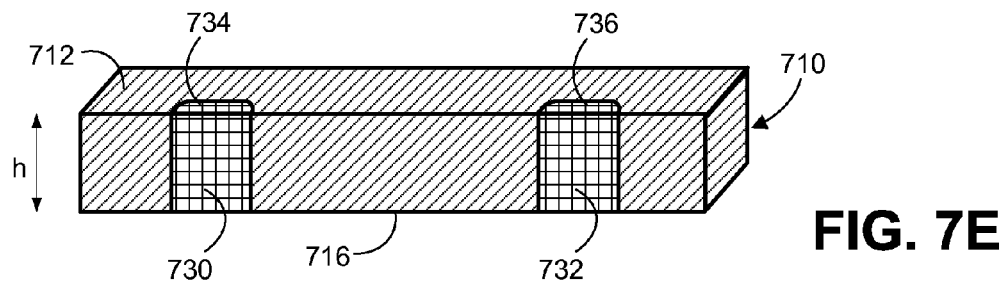

FIG. 7E shows a cutaway view after polishing the substrate 710 from the opposite side. For example, the substrate 710 may be adhered to a carrier substrate along the first side 712, and then the substrate can be thinned to create the polished surface 716. The thinning operation is performed so as to expose the conductive material 730, 732 within the two holes. The total thickness of the substrate 710, following thinning, is therefore less than the depth of the holes 720, 722. Following thinning, the conductive material 730, 732 provides electrical paths through the substrate 710 (i.e., from the first side 712 to the polished surface 716). The total thickness ("h") of the substrate 710, after polishing, can be less than 100 micrometers. For example, the substrate thickness may be between about 20 micrometers and about 70 micrometers. For instance, the substrate 710 may initially be a silicon wafer with a thickness of about 700 micrometers, and following polishing, the substrate 710 can have a thickness of about 70 micrometers with electrical pathways through the thinned substrate by the holes.

In some examples, however, the thinning process may be omitted entirely. Instead, the substrate may be a desired thickness prior to forming the holes 720, 722, and thus the holes may instead be apertures that pass through the entire thickness of such a substrate.

Figure 7F:
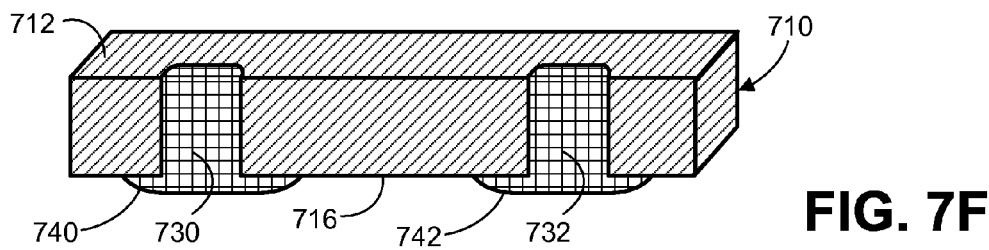

As shown in FIG. 7F, a pair of mounting pads 740, 742 may be formed on the polished surface 716. For example, one of the mounting pads 740 can be arranged to be electrically coupled to the conductive material 730, and the other of the mounting pads 742 can be arranged to be electrically coupled to the conductive material 732. Thus, the mounting pad 740 is electrically coupled to the co-planar top terminal 734 of the conductive material 730 and the mounting pad 742 is electrically coupled to the co-planar top terminal 736 of the conductive material 732. The mounting pads 740, 742 can be formed to occupy any pattern of non-overlapping areas on the polished surface 716. For instance, the mounting pads 740, 742 may be formed such that the mounting pad 740 occupies approximately half of the polished surface 716, and the mounting pad 742 occupies the other half of the polished surface 716. Such an arrangement can maximize alignment tolerances when flip-chip mounting the battery over bonding pads on another substrate. Many other patterns are also possible. In some cases, the mounting pads 740, 742 may be omitted entirely.

Figure 7G:
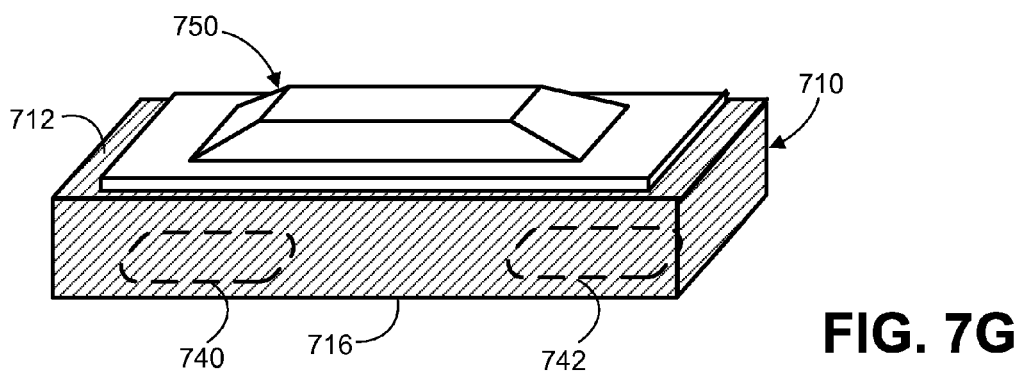

FIG. 7G illustrates the completed sealed battery after a battery stack (not visible) is formed on the first side 712 of the substrate 710 and then sealed by a sealant material covered by a moisture barrier 750. As noted above, some implementations may omit or modify the moisture barrier 750. The battery stack can be patterned such that a cathode terminal thereof is aligned to overlap the top terminal 734 of the conductive material 730 and an anode terminal thereof is aligned to overlap the top surface 736 of the conductive material 732. The battery shown in FIG. 7G can then be flip-chip mounted to corresponding bonding pads, similar to the description in connection with FIGS. 6F and 6G.

The sealed thin film battery can include a battery stack disposed on one side of a substrate (e.g., the first side 712 of the substrate 710), and conductive mounting pads disposed on the other side of the substrate (e.g., the mounting pads 740, 742 disposed on the polished surface 716 of the substrate 710). The battery stack includes an anode film, a cathode film, and an electrolyte film that separates the anode and cathode films. One of the mounting pads can be electrically coupled to the anode, and the other mounting pad can be electrically coupled to the cathode (e.g., by respective electrical paths that pass through the substrate). The battery stack can also be covered by a polymeric sealant material that is disposed over and around the battery stack. The polymeric sealant material may form a continuous seal against the substrate that completely surrounds the battery stack and thereby encapsulates the battery stack between the sealant layer and the substrate.

As noted above, the manufacturing process described in connection with FIGS. 6A-7G may be performed so as to form multiple battery chips on a common substrate. The common substrate can then be diced to separate the individual batteries, and the separated batteries can be sealed and then integrated into various electronic devices.

Once completed, the battery may be incorporated in a body-mountable device. For example, the battery could be incorporated in an eye-mountable device similar to the eye-mountable device 210 described above by flip-chip mounting the terminals 734, 736 to corresponding terminals on a substrate embedded in such a device. A controller can also be electrically coupled to the battery through interconnects.

C. Example Battery Fabrication Process

Figure 8:
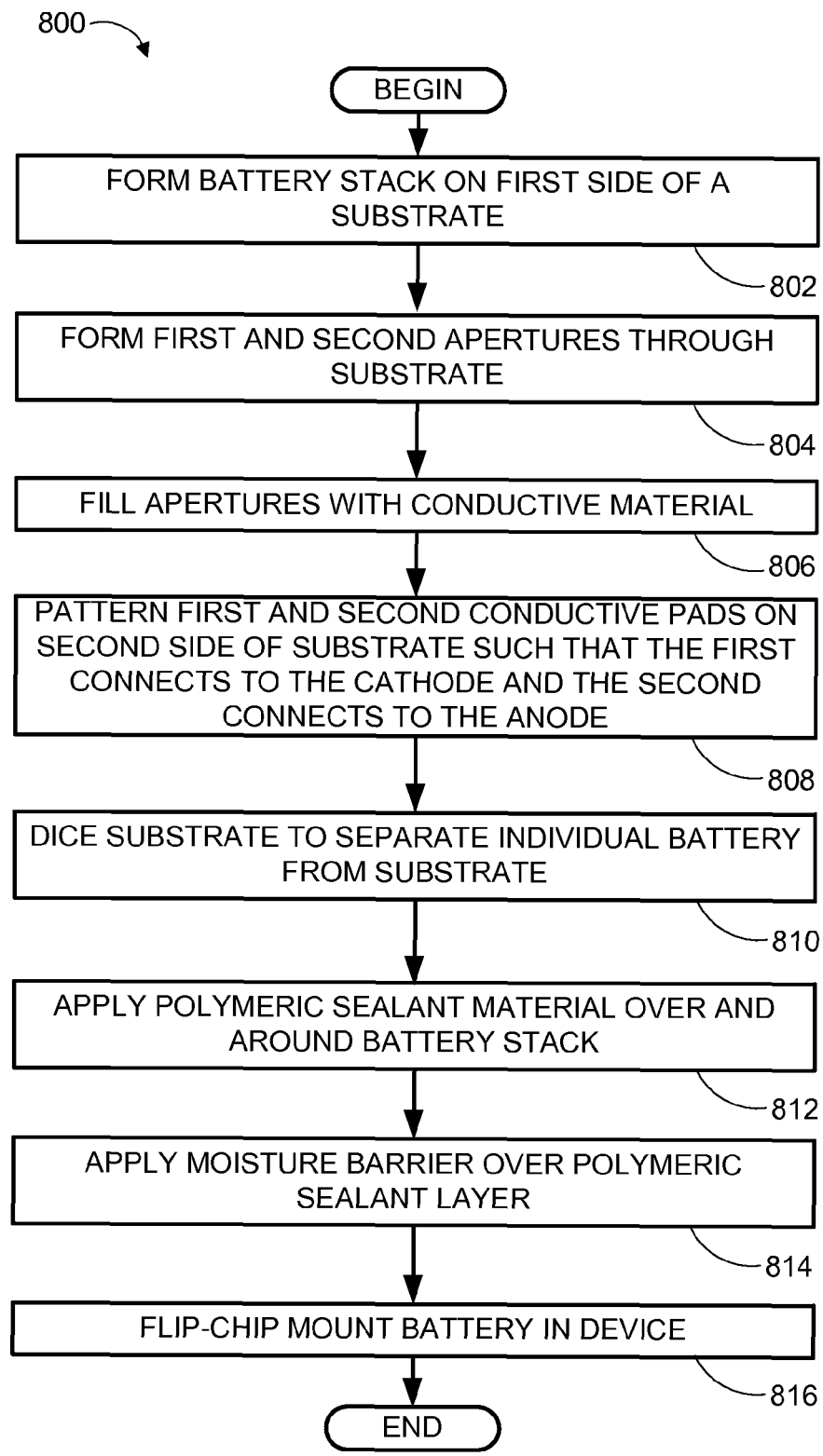
FIG. 8 is a flowchart of an example process for fabricating a sealed solid state battery.

FIG. 8 is a flowchart of an example fabrication process 800 for producing a sealed thin film battery. The process 800 may involve fabricating multiple batteries in parallel on a common substrate.

At block 802, a battery stack is formed on a first side of a substrate. An example process for forming the battery stack may involve forming a cathode current collector layer on the first side of the substrate. The cathode current collector layer can occupy at least a first region of the first side of the substrate. The battery stack formation may also involve forming a cathode active layer on the cathode current collector layer. The battery stack formation may also involve forming an electrolyte layer on the cathode active layer. The battery stack formation may also involve forming an anode active layer on the electrolyte layer. The battery stack formation may also involve forming an anode current collector layer on the anode active layer. A portion of the anode current collector layer can extend beyond the anode active layer so as to be disposed on the first side of the substrate without overlapping the cathode current collector layer. As a result, the anode current collector layer can occupy at least a second region of the first side of the substrate (e.g., a region that does not overlap the first region). Thus, a portion of the first region of the substrate on which the cathode current collector is disposed can define a cathode terminal of the battery stack, and a portion of the second region of the substrate on which the anode current collector is disposed can define an anode terminal of the battery stack.

The battery stack formation may also include one or more annealing processes (e.g., to crystallize the cathode film). Moreover, other fabrication processes can be used to form a battery stack on the first side of the substrate, including processes in which the anode film is formed before the cathode film. Once formed, the battery stack can include, at least, an electrolyte film, a cathode film in contact with the electrolyte film, and an anode film in contact with the electrolyte film but not in contact with the cathode film. The films may be co-planar, such as occurs by layering films on top of one another over a planar substrate, but various form factors are possible in which the anode and cathode films are in contact with locally opposed surfaces of the electrolyte film. Such form factors may be selected depending on size/weight constraints in particular applications among other factors. For instance, some form factors may include curved surfaces at which the electrolyte film contacts the respective electrode films.

At block 804, first and second apertures can be formed through the substrate. The apertures provide space for conductive vias that can electrically couple the anode and cathode of the battery stack to conductive mounting pads on the opposite side of the substrate. The apertures may be formed following formation of the battery, such as by an anisotropic etching process that etches through the substrate from the reverse side of the battery to expose the anode and cathode terminals of the battery. For instance, the battery stack side of the substrate may be adhered to a carrier substrate, and apertures can be etched through the substrate from the reverse side. At block 806, the apertures are filled with conductive material. For example, silver, gold, platinum, or another metal can be electroplated over a seed layer formed on the sidewalls on the apertures. The conductive material can extend continuously through the substrate along the sidewalls of the apertures and thereby define electrical paths through the substrate, one of which is electrically coupled to the cathode and the other of which is electrically coupled to the anode. The electrical paths through the substrate defined by the apertures filled with conductive material are also referred to herein as vias.

Apertures may also be formed prior to formation of the battery, such as by laser ablation and/or anisotropic etching. In such an example, the apertures can also be filled with conductive material prior to forming the battery stack on the substrate. The battery stack can then be formed such that the cathode terminal is aligned with one of the vias (i.e., conductive pathways through the substrate defined by the apertures) and the anode terminal is aligned with the other via.

At block 808 first and second conductive pads can be patterned on the second side of the substrate. Each of the conductive pads can be patterned over one of the vias such that the first conductive pad is electrically coupled to the cathode of the battery stack and the second conductive pad is electrically coupled to the anode of the battery stack. The two conductive terminals on the second side of the substrate can therefore be used to electrically connect to the battery formed on the first side of the substrate. Forming the apertures through the substrate, at least partially filling the apertures with conductive material, and/or forming the conductive mounting pads may involve adhering the first side of the substrate (with or without the battery formed thereon) to a carrier substrate to thereby facilitate processing on the second side of the substrate.

At block 810, the substrate can be diced, which separates the individual battery cells from one another. Thus, in some examples, multiple battery cells can be simultaneously formed on a common substrate, and vias and mounting terminals for those battery cells can be formed on the opposite side of the common substrate before the substrate is diced. Of course, in cases, the common substrate may be diced earlier, and vias and/or mounting pads can be fabricated in the substrates of individual battery cells.

At block 812, a polymeric sealant material can be applied over and around the battery stack of the separated battery. As noted above, the polymeric sealant material can be a low temperature polymeric formulation, such as a polymer that becomes deformable above a particular temperature (e.g., between about 100° C. and about 200° C.). For instance, the polymeric sealant material may be a polyethylene material, a polyamide material, polypropylene material, or any other thermoplastic or thermosetting polymer. The polymeric sealant material may be applied by an applicator that spreads the sealant material over and around the battery stack. The polymeric sealant material can then conform over and around the sides of the battery stack (e.g., by flowing) and create a continuous seal along the substrate that entirely surrounds the battery stack. The polymeric sealant material may also be applied by spin coating or spraying the sealant material to form a continuous layer above and around the battery stack. Because the polymeric sealant material can form a continuous layer that seals against the substrate on all sides of the battery stack, the polymeric sealant material can encapsulate the battery stack between the sealant material and the substrate.

At block 814, a moisture barrier can be applied over the polymeric sealant layer. The moisture barrier can inhibit moisture from reaching the polymeric sealant material and the battery stack. In some examples, the moisture barrier can be metallic or ceramic layer that is deposited over the sealant layer by a sputtering process. In some instances, the moisture barrier may be a flexible foil that can be applied over the polymeric sealant material, and then compressed and/or heated to cause the foil and the polymeric sealant to assume a desired shape. For example, the moisture barrier can be compressed against the substrate by applying pressure around the side edges thereof. The compression can force excess polymeric sealant material to flow out from under the cavity formed by the moisture barrier, and bring the side edges of the moisture barrier close to the substrate. The shape that can be held, at least in part, by cooling, which causes the thermoplastic polymeric sealant material to harden, which also fixes the shape of the compressed foil. In some examples, the polymeric sealant material may be formed to take a shape suitable for receiving the sputtered moisture barrier (e.g., by applying a mold to the sealant material), and then the moisture barrier can be sputtered onto the formed sealant material. Alternative techniques for applying the moisture barrier are also possible. In some instances, the moisture barrier can be deformed and/or formed so as to extend along sidewalls of the substrate on which the battery stack is disposed. The extended sides enhance the moisture resistance of the resulting device. Moreover, in some cases, the moisture barrier can be applied solely to the top surface of the moisture barrier in a layer that is substantially parallel to the plane of the substrate on which the battery stack is disposed.

At block 816, the battery chip can be mounted to another substrate of an electronic device. The substrate can include bonding pads that electrically coupled to electronics disposed on the substrate, such that upon mounting the battery can be used to power those electronics. In some examples, the device in which the battery is integrated may be a body-mountable device or an implantable device used to measure analyte concentrations. For example, the sensor chip can be flip-chip mounted to conductive terminals on a substrate that also includes a controller and antenna, similar to the eye-mountable and/or body-mountable sensor platforms described in connection with FIGS. 1-2, for example. The substrate for the body-mountable device may be encapsulated, partially or entirely, by biocompatible polymeric material configured to mount to a body surface or be implanted within a host. In some cases, the substrate on which the battery is flip-chip mounted may be a substrate not typically employed in battery fabrication, such as a polymeric substrate that cannot withstand the annealing temperatures and/or solvents used in battery fabrication (e.g., a parylene substrate).

While a variety of different mounting techniques may be employed, at least some examples may involve applying an anisotropic conductive adhesive over bonding pads on the substrate. The conductive mounting pads battery can then be aligned with the bonding pads and pressure and/or heat can be applied to force the mounting pads against the bonding pads and create an electrical connection. As it cools, the anisotropic conductive adhesive can cure, which mechanically bonds the battery in place. As a result, the battery can be securely coupled to the bonding pads.

VI. Additional Embodiments

It is noted that while the various electronics platforms are described herein by way of example as an eye-mountable device or an ophthalmic device, it is noted that the disclosed systems and techniques for configurations of sealed thin film batteries can be applied in other contexts as well. For example, contexts in which measurements are obtained in-vivo and/or from relatively small sample volumes, or are constrained to small form factors (e.g., implantable biosensors or other electronics platforms) may employ the battery systems and processes described herein to power devices used for such measurements. In addition, some examples may include incorporating sealed thin film batteries into articles of clothing, adhesive patches, or other small form-factor devices used for tagging and/or identifying items, obtaining measurements, and/or communicating with other devices via wireless signals. In one example, an implantable medical device may include a sealed battery encapsulated in biocompatible material and implanted within a host organism. The implantable medical device may include a circuit configured to output an indication of an analyte concentration measurement (e.g., an amperometric current reading). Reading and/or control devices can communicate with the implantable medical device to obtain measurements.

For example, in some embodiments, the electronics platform may include a body-mountable device, such as a tooth-mountable device. In some embodiments, the tooth-mountable device may take the form of or be similar in form to the body-mountable device 110 and/or the eye-mountable device 210. For instance, the tooth-mountable device may include a biocompatible polymeric material or a transparent polymer that is the same or similar to any of the polymeric materials or transparent polymers described herein and a substrate or a structure that is the same or similar to any of the substrates or structures described herein, although the exterior surface of the polymeric material may be formed to facilitate tooth-mounting, rather than eye-mounting. In such an arrangement, the tooth-mountable device may be configured to measure analyte concentration of a fluid (e.g., saliva) of a user wearing the tooth-mountable device. Other body mounting locations are also possible.

Moreover, in some embodiments, a body-mountable device may comprise a skin-mountable device. In some embodiments, the skin-mountable device may take the form of or be similar in form to the body-mountable device 110 and/or the eye-mountable device 210. For instance, the skin-mountable device may include a biocompatible polymeric material or a transparent polymer that is the same or similar to any of the polymeric materials or transparent polymers described herein and a substrate or a structure that is the same or similar to any of the substrates or structures described herein, although the exterior surface of the polymeric material may be formed to facilitate skin-mounting, rather than eye-mounting. In such an arrangement, the body-mountable device may be configured to measure analyte concentration of a fluid (e.g., perspiration, blood, etc.) of a user wearing the body-mountable device.

In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes shown and described in connection with FIG. 8.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A sealed battery comprising:
a substrate having a first side, a second side, and sidewalls;
a battery stack disposed on the first side of the substrate, wherein the battery stack comprises a cathode layer, an anode layer, and an electrolyte layer, wherein a first one of the cathode layer and the anode layer is disposed on the first side of the substrate, and wherein the electrolyte layer is disposed between the cathode layer and the anode layer;
a polymeric sealant layer formed over and around the battery stack and the substrate, wherein the polymeric sealant layer is substantially resistant to water swelling and extends along at least a portion of the sidewalls of the substrate;
a moisture barrier disposed around the polymeric sealant layer to thereby inhibit moisture from reaching the polymeric sealant layer and the battery stack,
wherein the moisture barrier is a continuous film that is substantially impervious to moisture, wherein the moisture barrier adheres directly against the sidewalls of the substrate, and wherein the moisture barrier entirely surrounds at least a portion of the battery stack and the polymeric sealant layer;

a first conductive pad situated on the second side of the substrate, wherein the first conductive pad is electrically coupled to the cathode layer; and a second conductive pad situated on the second side of the substrate, wherein the second conductive pad is electrically coupled to the anode layer.

2. The sealed battery of claim 1, wherein the polymeric sealant layer is a substantially continuous layer that fully encapsulates the battery stack between the polymeric sealant layer and the substrate.

3. The sealed battery of claim 1, wherein the polymeric sealant layer becomes deformable above a temperature of between 100° C. and 200° C.

4. The sealed battery of claim 1, wherein the moisture barrier is a metallic or ceramic coating.

5. The sealed battery of claim 1, wherein the moisture barrier comprises:
a raised top region that is approximately parallel to the substrate; and
a transition region that trends toward the substrate from the raised top region.

6. The sealed battery of claim 1,
wherein an electrical path that couples the cathode layer and the first conductive pad includes a first via, wherein the first via comprises a first conductive material that at least partially occupies a first aperture through the substrate, and
wherein an electrical path that couples the anode layer and the second conductive pad includes a second via, wherein the second via comprises a second conductive material that at least partially occupies a second aperture through the substrate.

7. The sealed battery of claim 1, wherein the cathode layer comprises a cathode active layer and a cathode current collector layer electrically coupled to the first conductive pad, wherein the cathode current collector layer comprises a first conductive material disposed on the first side of the substrate, and wherein the cathode active layer is disposed on the cathode current collector layer, and
wherein the anode layer comprises an anode active layer and an anode current collector layer electrically coupled to the second conductive pad, wherein the anode active layer comprises lithium metal disposed on the electrolyte layer, and wherein the anode current collector layer comprises a second conductive material disposed on the anode active layer.

8. The sealed battery of claim 1, further comprising:
a secondary substrate;
a control chip disposed on the secondary substrate;
a bonding terminal disposed between the secondary substrate and the first conductive pad, wherein the bonding terminal is electrically coupled to the control chip via interconnects patterned on the secondary substrate; and
an anisotropic conductive adhesive material embedded with a first set of conductive particles disposed between the bonding terminal and the first conductive pad,
wherein the anisotropic conductive adhesive material comprises a second set of conductive particles distributed within an adhesive matrix, and
wherein at least one of the conductive particles provides electrical conductivity between the first conductive pad and the bonding terminal.

9. The sealed battery of claim 1, wherein the moisture barrier adheres directly against the sidewalls of the substrate in a continuous ring.

10. The sealed battery of claim 1, wherein the polymeric sealant layer is a biocompatible material.

11. The sealed battery of claim 10, wherein the biocompatible material is parylene.

12. A body-mountable device comprising:
a polymeric material formed to have a body-mountable surface; and
a sealed battery embedded within the polymeric material, wherein the sealed battery comprises:
a substrate having a first side, a second side, and sidewalls;
a battery stack disposed on the first side of the substrate, wherein the battery stack comprises a cathode layer, an anode layer, and an electrolyte layer, wherein a first one of the cathode layer and the anode layer is disposed on the first side of the substrate, and wherein the electrolyte layer is disposed between the cathode layer and the anode layer;
a polymeric sealant layer formed over and around the battery stack and the substrate, wherein the polymeric sealant layer is substantially resistant to water swelling and extends along at least a portion of the sidewalls of the substrate;
a moisture barrier disposed around the polymeric sealant layer to thereby inhibit moisture from reaching the polymeric sealant layer and the battery stack,
wherein the moisture barrier is a continuous film that is substantially impervious to moisture,
wherein the moisture barrier adheres directly against the sidewalls of the substrate, and
wherein the moisture barrier entirely surrounds at least a portion of the battery stack and the polymeric sealant layer;
a first conductive pad situated on the second side of the substrate, wherein the first conductive pad is electrically coupled to the cathode layer; and
a second conductive pad situated on the second side of the substrate, wherein the second conductive pad is electrically coupled to the anode layer.

13. The body-mountable device of claim 12, wherein the polymeric material has a concave surface and a convex surface, wherein the concave surface is configured to be removably mounted over a corneal surface and the convex surface is configured to be compatible with eyelid motion when the concave surface is so mounted.

14. The body-mountable device of claim 12, wherein the body-mountable surface is tooth-mountable, and wherein the body-mountable device is configured to measure an analyte concentration of saliva.

15. The body-mountable device of claim 12, wherein the polymeric sealant layer is a substantially continuous layer that fully encapsulates the battery stack between the polymeric sealant layer and the substrate.

16. The body-mountable device of claim 12,
wherein an electrical path that couples the cathode layer and the first conductive pad includes a first via, wherein the first via comprises a first conductive material that at least partially occupies a first aperture through the substrate, and
wherein an electrical path that couples the anode layer and the second conductive pad includes a second via, wherein the second via comprises a second conductive material that at least partially occupies a second aperture through the substrate.

17. The body-mountable device of claim 12, further comprising electronics embedded in the polymeric material, wherein the electronics are configured to be powered by the sealed battery.

18. The body-mountable device of claim 17, further comprising:
- an electronics substrate at least partially embedded within the polymeric material; and
- a pair of conductive mounting pads disposed on the electronics substrate, wherein the pair of conductive mounting pads are arranged to correspond to the first and second conductive pads of the sealed battery, and
- wherein the sealed battery is disposed on the pair of conductive mounting pads such that the first and second conductive pads are each aligned with a respective one of the pair of conductive mounting pads.

19. A method comprising:
- forming a battery stack on a first side of a substrate, wherein forming the battery stack comprises: (i) forming a cathode current collector layer on the first side of the substrate, such that the cathode current collector layer occupies at least a first region of the first side of the substrate; (ii) forming a cathode active layer on the cathode current collector layer; (iii) forming an electrolyte layer on the cathode active layer; (iv) forming an anode active layer on the electrolyte layer; and (v) forming an anode current collector layer on the anode active layer, wherein a portion of the anode current collector layer extends beyond the anode active layer and is disposed on the first side of the substrate, such that the anode current collector layer occupies at least a second region of the first side of the substrate;
- forming a first aperture and a second aperture in the substrate, wherein the first aperture exposes, from a second side of the substrate, at least a portion of the cathode current collector layer, and wherein the second aperture exposes, from the second side of the substrate, at least a portion of the anode current collector layer;
- filling at least a portion of each of the first and second apertures with conductive material to thereby create respective electrical pathways through the substrate;
- forming, on the second side of the substrate, a first conductive pad that is electrically coupled to the conductive material within the first aperture, such that the first conductive pad is electrically coupled to the cathode current collector layer;
- forming, on the second side of the substrate, a second conductive pad that is electrically coupled to the conductive material within the second aperture, such that the second conductive pad is electrically coupled to the anode current collector layer;
- applying a polymeric sealant layer over and around the battery stack and the substrate to thereby encapsulate the battery stack between the polymeric sealant layer and the substrate,
- wherein the polymeric sealant layer is applied such that the polymeric sealant layer extends along at least a portion of sidewalls of the substrate, and
- wherein the polymeric sealant layer is substantially resistant to water swelling;
- applying a moisture barrier around the polymeric sealant layer to thereby inhibit moisture from reaching the polymeric sealant layer and the battery stack; and
- adhering the moisture barrier directly against the sidewalls of the substrate, wherein the moisture barrier is a continuous film that is substantially impervious to moisture, and
- wherein the moisture barrier entirely surrounds at least a portion of the battery stack and the polymeric sealant layer.

20. The method of claim 19, further comprising:
- situating the substrate and the battery stack disposed thereon over a pair of conductive mounting pads,
- wherein the pair of conductive mounting pads are arranged to correspond to the first and second conductive pads such that the first and second conductive pads are each aligned with a respective one of the pair of conductive mounting pads, and
- wherein the pair of conductive mounting pads are electrically coupled to electronics configured to be powered via the pair of conductive mounting pads;
- bonding the first and second conductive pads to the respective ones of the pair of conductive mounting pads; and
- encapsulating the conductive mounting pads, the electronics electrically coupled thereto, and the substrate and the battery stack disposed thereon within a polymeric material comprising a body-mountable surface.

* * * * *